United States Patent
Abeta et al.

(10) Patent No.: US 8,155,709 B2
(45) Date of Patent: Apr. 10, 2012

(54) IN-VEHICLE HANDSFREE APPARATUS

(75) Inventors: Takehiro Abeta, Anjo (JP); Toru Kakehi, Toyoake (JP)

(73) Assignee: Denso Corporation, Kariya, Aichi-pref. (JP)

( * ) Notice: Subject to any disclaimer, the term of this patent is extended or adjusted under 35 U.S.C. 154(b) by 355 days.

(21) Appl. No.: 12/378,708

(22) Filed: Feb. 18, 2009

(65) Prior Publication Data
US 2009/0209298 A1 Aug. 20, 2009

(30) Foreign Application Priority Data

Feb. 19, 2008 (JP) ................................. 2008-037503
May 21, 2008 (JP) ................................. 2008-133013

(51) Int. Cl.
*H04M 1/00* (2006.01)
*H04B 7/00* (2006.01)
(52) U.S. Cl. ..................................... 455/569.2; 455/567
(58) Field of Classification Search ............... 455/575.1, 455/575.9, 297, 563–567, 569.1–569.2, 403, 455/412.1, 412.2, 415–417, 41.2, 456.2, 455/99
See application file for complete search history.

(56) References Cited

U.S. PATENT DOCUMENTS

| | | | |
|---|---|---|---|
| 5,408,528 A | | 4/1995 | Carlson et al. |
| 6,067,355 A | * | 5/2000 | Lim et al. ................. 379/142.14 |
| 6,718,187 B1 | | 4/2004 | Takagi et al. |
| 6,993,367 B2 | | 1/2006 | Yamato et al. |
| 7,020,499 B2 | | 3/2006 | Moffi et al. |
| 7,274,288 B2 | | 9/2007 | Nagata |
| 7,308,289 B2 | * | 12/2007 | Sychta ........................ 455/569.1 |
| 7,327,226 B2 | | 2/2008 | Turnbull et al. |
| 7,349,722 B2 | | 3/2008 | Witkowski et al. |
| 7,376,434 B2 | | 5/2008 | Thomas et al. |
| 7,689,255 B2 | | 3/2010 | Kurauchi et al. |
| 7,873,392 B2 | * | 1/2011 | Matsuda ..................... 455/569.2 |
| 2004/0087335 A1 | | 5/2004 | Peiker |
| 2004/0151285 A1 | | 8/2004 | Sychta |
| 2005/0096099 A1 | | 5/2005 | Barclay et al. |
| 2005/0143054 A1 | * | 6/2005 | Fogel ............................ 455/415 |
| 2005/0202852 A1 | * | 9/2005 | Wada .......................... 455/569.1 |
| 2006/0040714 A1 | | 2/2006 | Suzuki |

(Continued)

FOREIGN PATENT DOCUMENTS

JP    07-048761    5/1995

(Continued)

OTHER PUBLICATIONS

Office Action dated Dec. 22, 2009 in Japanese Application No. 2008-037503 with English translation thereof.

(Continued)

*Primary Examiner* — Shawki S Ismail
*Assistant Examiner* — Crystal L Hammond
(74) *Attorney, Agent, or Firm* — Harness, Dickey & Pierce, P.L.C.

(57) ABSTRACT

An in-vehicle handsfree apparatus is disclosed. The in-vehicle handsfree apparatus includes a handsfree connection section and a control section. The connection section establishes connection with first and second cellular phones by using a handsfree communication protocol. When the control section determines that the first and second cellular phones are respectively receiving incoming calls at a same time, the control section causes an display unit to distinctly display information associated with the incoming call of the first cellular phone and information associated with the incoming call of the second cellular phone.

13 Claims, 8 Drawing Sheets

U.S. PATENT DOCUMENTS

| | | |
|---|---|---|
| 2006/0172780 A1 | 8/2006 | Krippgans |
| 2007/0026904 A1 | 2/2007 | Matsuda |
| 2007/0037607 A1 | 2/2007 | Matsuda |
| 2007/0054704 A1 | 3/2007 | Satoh |
| 2007/0066300 A1 | 3/2007 | Nishimura et al. |
| 2007/0127654 A1* | 6/2007 | Lin et al. .............. 379/142.01 |
| 2008/0039153 A1 | 2/2008 | Katoh et al. |
| 2008/0064419 A1 | 3/2008 | Ukon |
| 2009/0209295 A1 | 8/2009 | Suzuki |
| 2009/0209296 A1 | 8/2009 | Kimura et al. |
| 2009/0209297 A1 | 8/2009 | Suzuki |
| 2009/0209298 A1 | 8/2009 | Abeta et al. |

FOREIGN PATENT DOCUMENTS

| | | |
|---|---|---|
| JP | 09-046397 | 2/1997 |
| JP | 11-32105 | 2/1999 |
| JP | 11-68999 | 3/1999 |
| JP | 11-331328 | 11/1999 |
| JP | 2001-165668 | 6/2001 |
| JP | 2002-223288 | 8/2002 |
| JP | 2002-237869 | 8/2002 |
| JP | 2002-354109 | 12/2002 |
| JP | 2003-218996 | 7/2003 |
| JP | 2004-104298 | 4/2004 |
| JP | 2004-201249 | 7/2004 |
| JP | 2005-244875 | 9/2005 |
| JP | 2005-260822 | 9/2005 |
| JP | 2005-286553 | 10/2005 |
| JP | 2006-019908 | 1/2006 |
| JP | 2006-094477 | 4/2006 |
| JP | 2006-211365 | 8/2006 |
| JP | 2006-277827 | 10/2006 |
| JP | 2007-013541 | 1/2007 |
| JP | 2007-036678 | 2/2007 |
| JP | 2007-104343 | 4/2007 |
| JP | 2007-180947 | 7/2007 |
| JP | 2007-251455 | 9/2007 |
| JP | 2008-042717 | 2/2008 |

OTHER PUBLICATIONS

Final Office Action dated Jan. 11, 2011, in corresponding Japanese Application No. 2008-262785, with English translation thereof.

Office action dated Jan. 5, 2010 in corresponding Japanese Application No. 2008-262785.

Office Action dated Mar. 17, 2011 from corresponding U.S. Appl. No. 12/378,707.

Office Action dated Apr. 27, 2010 in Japanese Application No. 2008-133013 with English translation thereof.

Chinese Office Action dated Sep. 15, 2011 from SIPO in corresponding Chinese Patent Application No. 2009 1000 6452.X (with English translation).

Notice of Allowance dated Jun. 9, 2011 from the USPTO in the related U.S. Appl. No. 12/378,706.

Office Action dated Aug. 25, 2011 from the USPTO in the related U.S. Appl. No. 12/378,709.

Office Action dated Sep. 20, 2011 from the USPTO in the related U.S. Appl. No. 12/378,707.

* cited by examiner

| PHONE INFO. | RING TONE |
|---|---|
| PHONE INFO. "A" | RING TONE "A" |
| PHONE INFO. "B" | RING TONE "B" |
| PHONE INFO. "C" | RING TONE "C" |
| PHONE INFO. "D" | RING TONE "D" |
| PHONE INFO. "E" | RING TONE "E" |
| PHONE INFO. "F" | RING TONE "F" |
| ⋮ | ⋮ |

IN-VEHICLE HANDSFREE APPARATUS

CROSS REFERENCE TO RELATED APPLICATION

The present application is based on Japanese Patent Applications No. 2008-37503 filed on Feb. 19, 2008 and No. 2008-133013 filed on May 21, 2008, the disclosures of which are incorporated herein by reference.

BACKGROUND OF THE INVENTION

1. Field of the Invention

The present invention relates to a handsfree apparatus establishing connection with a cellular phone by using a handsfree communication protocol and determining whether the cellular phone connected with the handsfree apparatus is receiving an incoming call.

2. Description of Related Art

There is known an in-vehicle handsfree apparatus establishing connection with a cellular phone carried into a vehicle to provide a Hands-Free function (cf. JP-A-2006-94477). JP-A-2005-260822 corresponding to US-A-2005-0202852 discloses an in-vehicle handsfree apparatus described as follows. When the in-vehicle handsfree apparatus is connected with a cellular phone carried into a vehicle by using the Hands-Free Profile and when the cellular phone receives an incoming call, the in-vehicle handsfree apparatus causes a display unit to display information about the incoming call of the cellular phone or causes a speaker to output a ring tone, thereby to inform a user that the cellular phone is receiving the incoming call. Further, the in-vehicle handsfree apparatus causes the display unit to form an information item for a user operation on the incoming call. The information items is, for example, an incoming call answer switch for answering the incoming call or the incoming call reject switch for rejecting the incoming call.

Recently, some persons have multiple cellular phones, which are for personal use and for business use for instance. In view of this trend, the inventors have studied an in-vehicle handsfree apparatus that is connectable with or establishes multi-profile connection with multiple cellular phones at the same time by using the Hands-Free Profile, so that, even when the multiple cellular phones are carried into a vehicle, the handsfree apparatus can be ready to receive incoming calls of the multiple cellular phones.

As a related art, discussion is presented below on an in-vehicle handsfree apparatus connectable with multiple cellular phones by using the Hands-Free Profile. A possible situation is such that the multiple cellular phones connected with the in-vehicle handsfree apparatus are receiving incoming calls at the same time. In such a situation, a user needs to recognize the incoming calls received by the multiple cellular phones at the same time. Further, a user needs to distinctly recognize the incoming calls of the multiple cellular phones and perform an operation for answering or rejecting one or more of the incoming calls of the multiple cellular phones. However, there is not known an in-vehicle handsfree apparatus that can properly support the above situation.

SUMMARY OF THE INVENTION

In view of the above and other points, it is an objective of the present invention to provide an in-vehicle handsfree apparatus with high usability.

According to a first aspect of the present invention, an in-vehicle handsfree apparatus including a handsfree connection section and a control section is provided. The handsfree connection section is configured to establish connection with multiple cellular phones by using a handsfree communication protocol. The control section is configured to determine whether, of the multiple cellular phones, a first cellular phone connected with the handsfree connection section and a second cellular phone connected with the handsfree connection section are respectively receiving a first incoming call and a second incoming call at a same time. When the control section determines that the first and second cellular phones are respectively receiving the first and second incoming calls at a same time, the control section causes an external display unit to distinctly display: (i) a first incoming call information item associated with the first incoming call and a first operation information item associated with a user operation on the first incoming call; and (ii) a second incoming call information item associated with the second incoming call and a second operation information item associated with a user operation on the second incoming call.

According to the above in-vehicle handsfree apparatus, the first incoming call information item and the first operation information item are displayed distinctly from the second incoming call information item and the second operation information item. Therefore, it is possible to properly inform a user of reception of incoming calls in multiple cellular phones, and it is possible improve usability.

According to a second aspect of the present invention, an in-vehicle handsfree apparatus including a handsfree connection section and a control section is provided. The handsfree connection section is configured to establish connection with multiple cellular phones by using a handsfree communication protocol. The control section is configured to determine whether, of the multiple cellular phones, a first cellular phone connected with the handsfree connection section and a second cellular phone connected with the handsfree connection section are respectively receiving a first incoming call and a second incoming call at a same time. When the control section determines that the first and second cellular phones are respectively receiving the first and second incoming calls at the same time, the control section causes an external ring tone output unit to time-divisionally perform an output of a first ring tone corresponding to the first incoming call and an output of a second ring tone corresponding to the second incoming call.

According to the above in-vehicle handsfree apparatus, multiple ring tones are not outputted overlappingly but are alternately outputted. Thereby, it is possible to properly inform a user of ring tones associated with multiple cellular phones and it is possible to improve usability.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EXEMPLARY EMBODIMENTS

First Embodiment

Figure 1:
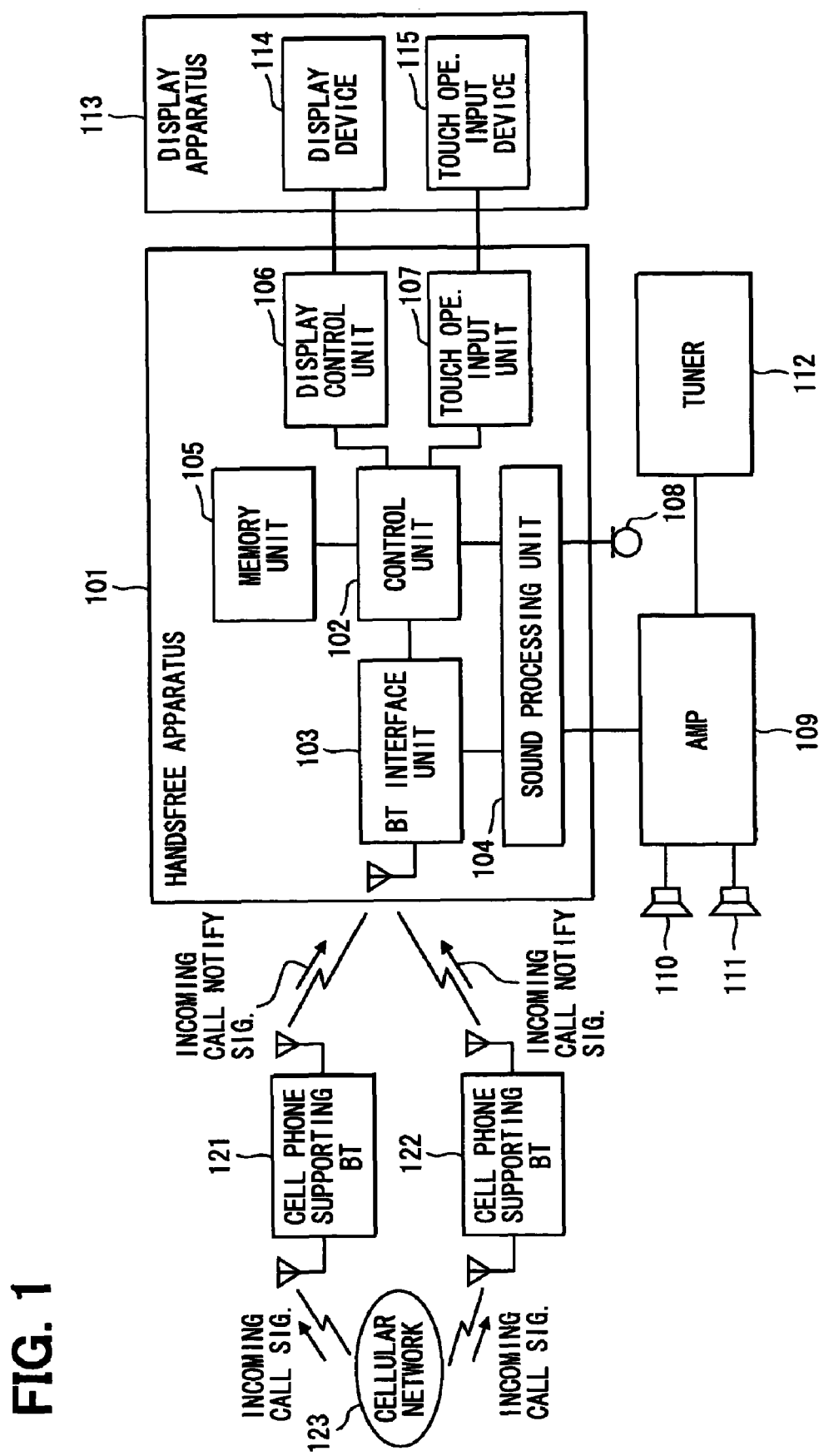
FIG. 1 is a functional block diagram of a handsfree apparatus according to a first embodiment.

A first embodiment is described below with reference to the accompanying drawings.

In the following, two cellular phones each having Bluetooth (registered trademark; also referred to hereinafter as BT) communication function are assumed as an example of multiple cellular phones. Further, the two cellular phones are assumed to be carried into a vehicle.

An in-vehicle handsfree apparatus 101 is mounted to a vehicle. The in-vehicle handsfree apparatus 101 includes a control unit 102, a BT interface unit 103, a communication sound processing unit 104, a memory unit 105, a display control unit 106, and a touch operation input unit 107. The control unit 102 can function as a control means or section. The BT interface unit 103 can function as a handsfree connection means or section, a ring tone reception means or section, and an identification information reception means or section. The memory unit 105 can function as a memory means or section.

The control unit 102 includes a CPU, a RAM, a ROM, and an I/O bus. The control unit 102 controls general operations of the in-vehicle handsfree apparatus 101, such as a communication operation, a data management operation, and the like. The BT interface unit 103 supports a Hands Free Profile (HFP; also refereed to herein as a handsfree communication protocol) for handsfree communication and a Phone Book Access Profile (PBAP) for transfer of phonebook data, incoming call history data, outgoing call history data and the like. The HFP and the PBAP are specified by BT communication specification for handsfree communication. By the HFP, the BT interface unit 103 is connectable at the same time with multiple cellular phones supporting the BT, and can support a multi-connection profile.

When a first cellular phone 121 and a second cellular phone 122 each having a BT communication function are carried into a vehicle and are present within the BT communication range of the BT interface unit 103, the BT interface unit 103 establishes connection with the first and second cellular phones 121, 122 by using the HFP. Each of the above profiles means a communication protocol defined for a corresponding function.

The communication sound processing unit 104 is coupled with a microphone 108 and an audio amplifier 109. The microphone 108 is positioned close to, for example, a steering wheel to clearly collect sounds vocalized by a user. The audio amplifier 109 is disposed in an external part of the in-vehicle handsfree apparatus 101. When handsfree communication is performed using one of the first and second cellular phones 121, 122 carried into the vehicle, the microphone 108 receives outgoing speech vocalized by a user. Then, the communication sound processing unit 104 receives a signal representing the outgoing speech, executes sound-processing of the outgoing speech sounds, and outputs the processed signal to the BT interface unit 103. Also, the communication sound processing unit 104 receives a signal representing incoming speech from the BT interface unit 103, and outputs the received signal to the audio amplifier 109. When the audio amplifier 109 receives the signal representing the incoming speech from the communication sound processing unit 104, the audio amplifier 109 amplifies the incoming speech, and causes speakers 110 and 111 to output the amplified incoming speech. The speaker 110, 111 can function as a sound output means or unit.

The speakers 110 and 111 are located in the vehicle in a symmetric manner about an axis of symmetry, which axis may be parallel to a vehicle overall length direction. For example, the speaker 110 may be located in a driver side door, and the speaker 111 may be located in a front passenger side door. The audio amplifier 109 is also coupled with a tuner 112 such as a tuner deck. When the tuner 112 receives a signal representing, for example, a radio program from a radio station or a signal representing music sounds stored in a storage medium for music, the audio amplifier 109 amplifies the inputted music sound or the radio program sound. The speakers 110 and 111 outputs such amplified sounds.

Figures 2, 3:
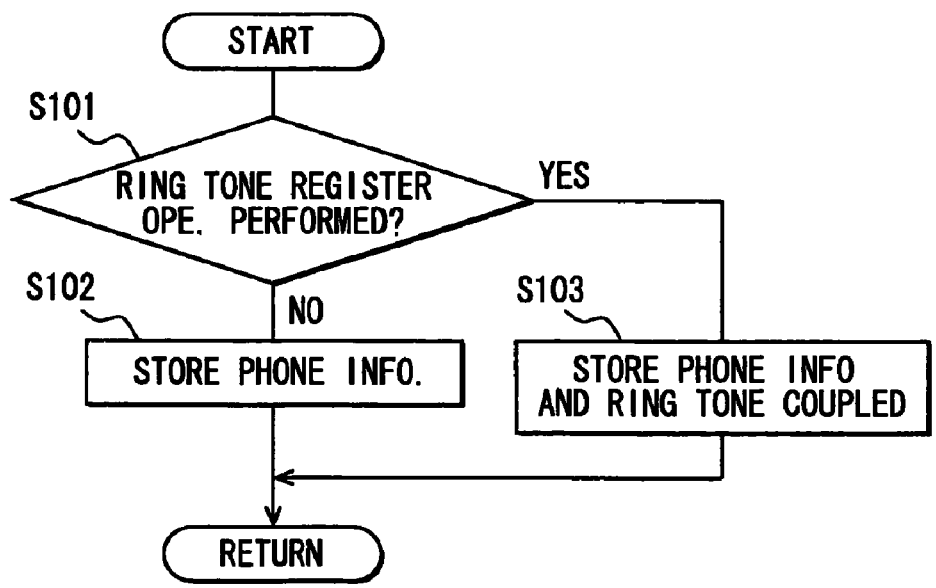
FIG. 2 is a diagram illustrating ring tone registration data according to the first embodiment.
FIG. 3 is a flow chart of a phone information registration procedure according to the first embodiment.

The memory unit 105 stores various types of data, which are for example phonebook data, outgoing call history data, incoming call history data and the like. The phonebook data is associated with a correspondence between phone numbers and registered names. The outgoing call history data is associated with a time and a dialed phone number of an outgoing call from the in-vehicle handsfree apparatus 101 or the first or second cellular phones connected with the in-vehicle handsfree apparatus 101 by using the HFP. The incoming call history data is associated with a time and a caller's phone number of an incoming call received by the first or second cellular phone. Further, the memory unit 105 stores ring tone registration data associated with a correspondence between phone information about each cellular phone and a ring tone, as shown in FIG. 2. The phone information about each cellular phone is a phone number for instance.

When a user registers a cellular phone on the in-vehicle handsfree apparatus 101 in advance to allow handsfree connection between the in-vehicle handsfree apparatus 101 and the cellular phone, if the cellular phone supports an in-band ring tone and capable of transferring a ring tone registered thereon, it is not necessary to register a ring tone corresponding to the cellular phone in registering phone information about the cellular phone on the in-vehicle handsfree apparatus 101. If the cellular phone does not support the in-band ring tone, a ring tone corresponding to the cellular phone may be registered in registering the phone information about the cellular phone. When a registration operation is performed to register the phone information and the ring tone, the control unit 102 causes the memory unit 105 to store, as the ring tone registration data, an information item indicating a correspondence relation between the phone information about the cellular phone and the ring tone.

A display apparatus 113 includes a display device 114 and a touch operation input device 115. The display device 114 can function as a display means or unit, and includes a display screen. The touch operation input device 115 provides a touch-sensitive switch on the display screen. When the display control unit 106 receives a display instruction signal from the control unit 102, the display control unit 106 controls display of the display device 114 based on the inputted display instruction signal. The touch operation input device 115 outputs an operation detection signal in response to a user operation of the touch-sensitive switch on the display screen. When the touch operation input unit 107 receives the operation detection signal, the touch operation input unit 107 outputs the operation detection signal to the control unit 102. When the control unit 102 receives the operation detection signal, the control unit 102 analyses the operation detection signal to perform an operation.

When the first cellular phone 121 or the second cellular phone 122 receives an incoming call signal from a cellular network 123 as a communication network in a standalone state where a communication line is disconnected between the in-vehicle handsfree apparatus 101 and the first or second cellular phone 121, 122, the phone 121 or 122 performs an incoming call notification operation, such as displaying on a display portion (not shown) an information item indicating a message that an incoming call is being received, outputting a pre-registered ring tone from a speaker (not shown), and the like.

In the above case, when the first or second cellular phones 121, 122 receives a caller ID such as a caller's phone number from the cellular network 123, the phone 121, 122 notifies a user of caller's information in the following manners: the display portion displays a caller's phone number received from the cellular network 123; by searching the phonebook data, the display portion displays a registered name stored in association with the caller's phone number; or the speaker outputs a ring tone registered corresponding to the caller's phone number. When a user recognizes the incoming call and operates an incoming call answer key (not shown) for responding to the incoming call, the cellular phone 121 or 122 transmits an incoming call answer signal to the cellular network 123. When a user recognizes the incoming call and operates an incoming call reject key (not shown) for rejecting the incoming call, the cellular phone 121 or 122 transmits an incoming call reject signal to the cellular network 123.

When the first cellular phone 121 or the second cellular phone 122 receives an incoming call signal from the cellular network 123 in a state where a communication line is connected between the in-vehicle handsfree apparatus 101 and the first or second cellular phone 121, 122 by using the HBP, the first or second cellular phone 121 or 122 transmits an incoming call notification signal to the in-vehicle handsfree apparatus 101. In the above case, the cellular phone 121, 122 transmits to the in-vehicle handsfree apparatus 101 identification information for identification of the subject cellular phone. The identification information is, for example, a phone number registered on the subject cellular phone. When the cellular phone 121 or 122 receives the caller's phone number from the cellular network 123, the cellular phone 121 or 122 transmits the caller's phone number to the in-vehicle handsfree apparatus 101. When the cellular phone 121 or 122 supports the in-band ring tone, the cellular phone 121 or 122 transmits the ring tone registered thereon to the in-vehicle handsfree apparatus 101.

When the cellular phone 121 or 122 supports the in-band ring tone, and when the cellular phone 121 or 122 does not receive the caller ID from the cellular network 123, the cellular phone 121 or 122 transmits to the in-vehicle handsfree apparatus 101 a ring tone that has been registered on the phones 121 or 122 in advance as that corresponding to unspecified phone numbers. When the cellular phone 121 or 122 receives the caller ID and when the ring tone corresponding to the received caller ID is registered, the cellular phone 121 or 122 transmits the ring tone to the in-vehicle handsfree apparatus 101.

Operation of the in-vehicle handsfree apparatus 101 is described below with reference to FIGS. 3 to 5B in an order of (I) phone information registration procedure and (II) incoming call procedure.

(I) Phone Information Registration Procedure

The control unit 102 of the in-vehicle handsfree apparatus 101 starts to execute a phone information registration procedure exemplified in FIG. 3 in response to a signal or a trigger for start of the phone information registration procedure. The trigger is, for example, such that a user operates the touch operation input device 115 and performs an operation for displaying a registration window on the display device 114 to register a cellular phone. When the phone registration procedure starts, the control unit 102 determines at S101 whether an operation for registering a ring tone corresponding to the cellular phone is performed.

As described above, if the cellular phone supports the in-band ring tone, it is not necessary to register a ring tone corresponding to the cellular phone when a user registers information about the cellular phone on the in-vehicle handsfree apparatus 101 to allow handsfree connection between the in-vehicle handsfree apparatus 101 and the cellular phone. If the cellular phone does not support the in-band ring tone, a ring tone corresponding to the cellular phone may be registered when the phone information about the cellular phone is registered.

When the control unit 102 determines that, although an operation for registering phone information about a cellular phone is performed, an operation for registering a ring tone corresponding to the cellular phone is not performed, corresponding to "NO" at S101, process proceeds to S102. The control unit 102 causes at S102 the memory unit 105 to store the phone information inputted by a user, and then, the phone information registration procedure is ended. When the control unit 102 determines that an operation for registering phone information about a cellular phone is performed and then an operation for registering a ring tone corresponding to the cellular phone is performed, corresponding to "YES" at S101, process proceeds to S103. At S103, the control unit 102 causes the memory unit 105 to store the phone information inputted by a user, a ring tone selected by a user, and a correspondence between the inputted phone information and the selected ring tone, and then the phone information registration procedure is ended.

(II) Incoming Call Procedure

Figure 4:
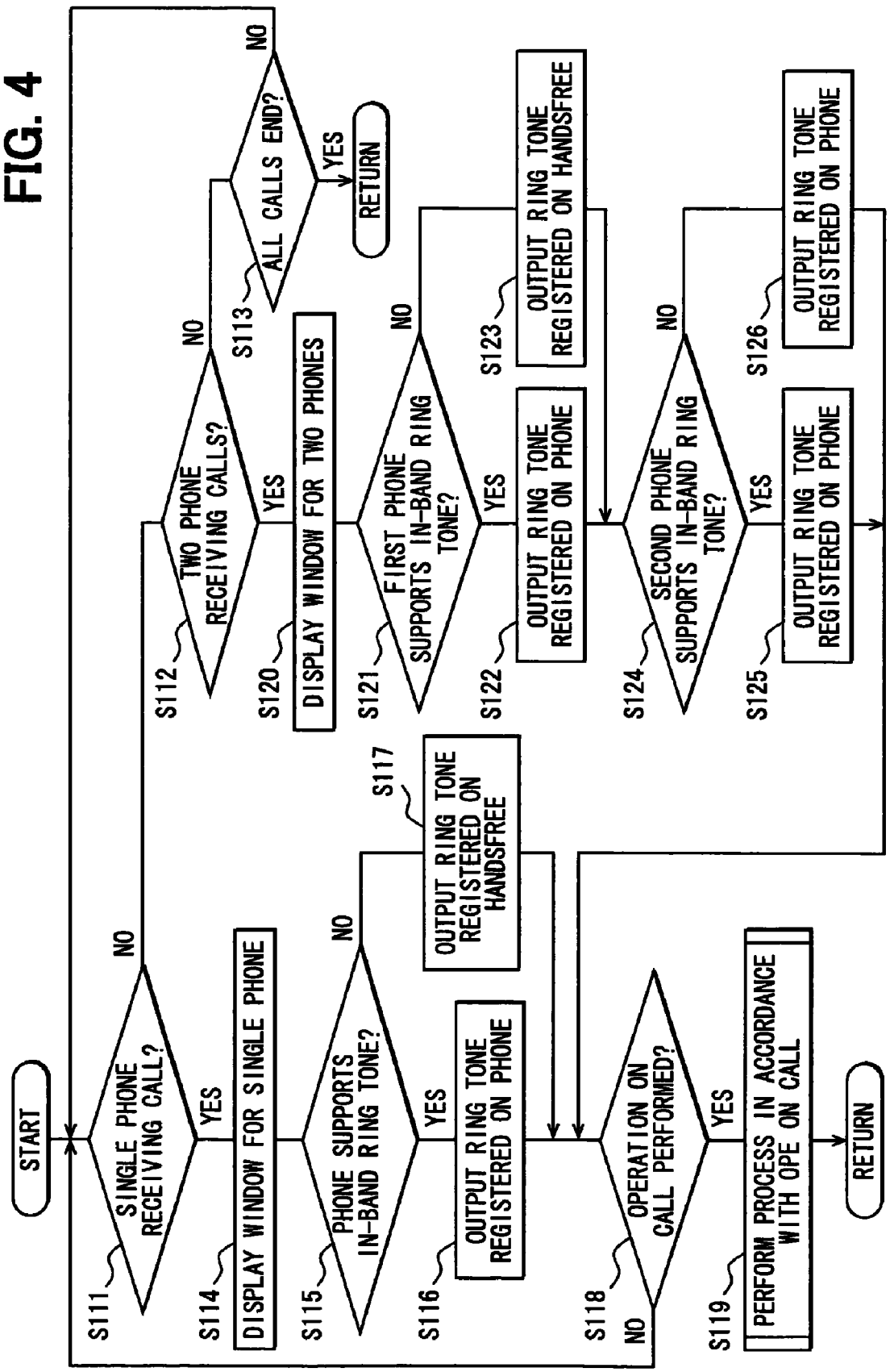
FIG. 4 is a flow chart of an incoming call procedure according to the first embodiment.

The control unit 102 of the in-vehicle handsfree apparatus 101 starts to execute an incoming call procedure exemplified in FIG. 4 in response to a signal or a trigger for start of the incoming call procedure. The trigger is for example such that the control unit 102 receives an incoming call notification signal from one of first and second cellular phones 121, 122 via the BT interface unit 103. When the control unit 102 starts the incoming call procedure, the control unit 102 determines at S111 and S112 whether the number of cellular phones presently receiving incoming calls is one or two. At S113, the control unit 102 determines whether all of the incoming calls are ended.

It is assumed here that the first cellular phone receives an incoming call first (i.e., earlier) among the first and second cellular phones 121 and 122. When the control unit 102 determines that the number of cellular phones receiving incoming calls is one due to the reception of an incoming call by the first cellular phone 121, corresponding to "YES" at S111, process proceeds to S114. At S114, the control unit 102 causes the display device 114 to display on the display screen a window for a case where one cellular phone is receiving an incoming call. The above case is referred to also as a single phone ringing case. In the single phone ringing case, when the control unit 102 receives a caller's phone number from the first cellular phone 121, which first receives an incoming call, the control unit 102 causes the display device 114 to display the caller's phone number, and display a registered name corresponding to the caller's phone number if the phonebook data contains the registered name corresponding to the caller's phone number.

Figure 5A:
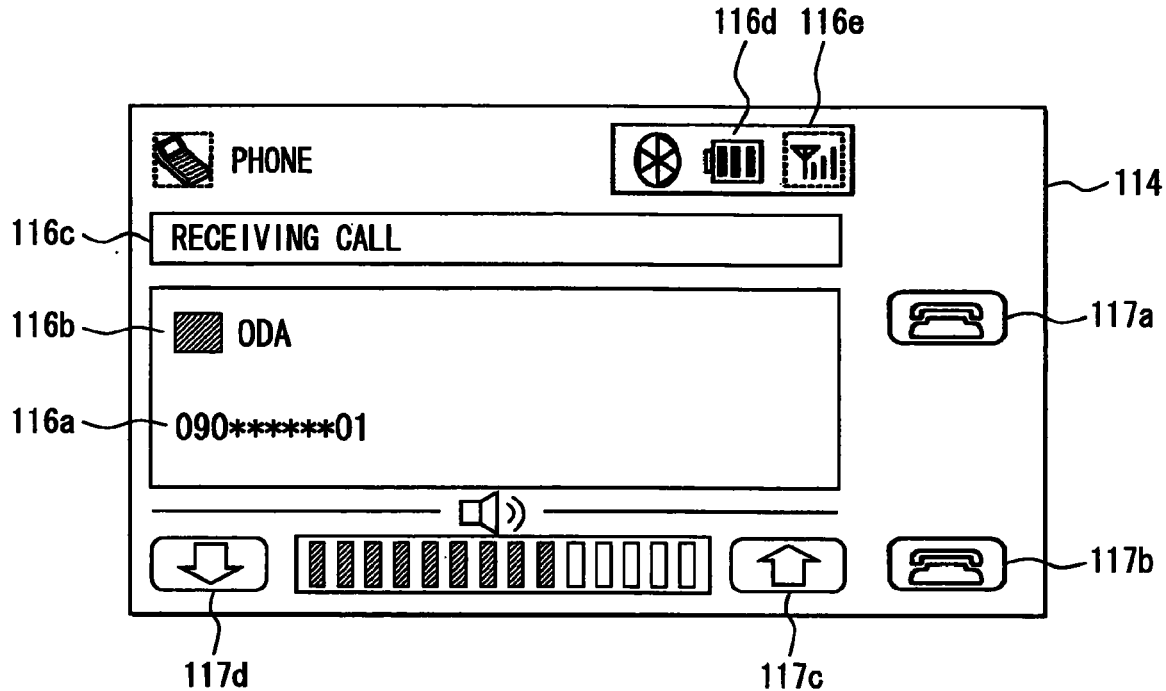
FIG. 5A is a diagram illustrating a window on a screen display for a case where one cellular phone is receiving an incoming call according to the first embodiment.

FIG. 5A exemplifies a window for a case where: the control unit 102 receives a caller's phone number "090xxxxxx01" from the first cellular phone 121, which first receives an incoming call; the phonebook data contains a name registered as "Mr. Oda" corresponding to the received caller's phone number; and the control unit 102 causes the display device 114 to display the caller's phone number "090xxxxxx01" and the registered name "Mr. Oda" on a generally whole region of the display screen. In addition to the above incoming call information items, the control unit 102 further causes the display device 114 to display a message 116c that an incoming call is being received, a remaining battery level information item 116d indicating a remaining battery level of the cellular phone 121, and a radio reception information item 116e indicative of a radio reception sensitivity state of the first cellular phone 121. The above information about the radio reception sensitivity and the remaining battery level is transmitted from the first cellular phone 121. The information item indicating a massage that an incoming call is being received and the information items indicating a caller phone number and a registered name are examples of an incoming call information item.

At S115, the control unit 102 determines whether the control unit 102 receives a ring tone from the first cellular phone 121 via the BT interface unit 103 and whether the first cellular phone supports the in-band ring tone. When the control unit 102 determines that the control unit 102 receives the ring tone from the first cellular phone 121 via the BT interface unit 103 and the first cellular phone supports the in-band ring tone, corresponding to "YES" at S115, process proceeds to S116. At S116, the control unit 102 causes both of first and second speakers 110, 111 to output the ring tone received from the first cellular phone 121 via the BT interface unit 103. In other words, the control unit 102 causes both of the first and second speakers 110 and 111 to output the ring tone that is generally same as that registered on the first cellular phone 121.

When the control unit 102 determines that the control unit 102 does not receives the ring tone from the first cellular phone 121 via the BT interface unit 103 and the first cellular phone does not support the in-band ring tone, corresponding to "NO" at S115, process proceeds to S117. At S117, the control unit 102 searches the ring tone registration data stored in the memory unit 105 and causes both of the speakers 110 and 111 to output the ring tone registered in registration of the first cellular phone 121. In other words, the control unit 102 causes the speakers 110 and 111 to output the ring tone that is registered on the in-vehicle handsfree apparatus 101.

According to the above manners, a user can visually recognize an incoming call receiving with the first cellular phone 121, by taking a look at the display device 114 displaying an information item indicating that an incoming call is being received and other information items indicative of the caller's phone number and the registered name. Further, a user can aurally recognize the incoming call received by the first cellular phone 121 by listening to the ring tone outputted from both of the speakers 110 and 111.

Further, on the window for the single phone ringing case, the control unit 102 causes the display device 114 to form the followings: an incoming call answer switch 117a for responding to the incoming call; an incoming call reject switch 117b for rejecting the incoming call; a volume up switch 117c for increasing a sound volume of the ring tone outputted from both of the speakers 110 and 111; and a volume down switch 117d for decreasing the sound volume of the ring tone outputted from both of the speakers 110 and 111. The incoming call answer switch 117a and the incoming call reject switch 117b displayed on the display device 114 are an example of an operation information item.

At S118, the control unit 2 determines whether an operation on the incoming call is performed in a state where the window for the single phone ringing case is being displayed. When the control unit 102 determines that the operation on the incoming call is performed, corresponding to "YES" at S118, process proceeds to S119. At S119, in accordance with the operation on the incoming call, the control unit 102 executes a process for responding or rejecting the incoming call for instance, and then, the incoming call procedure is ended.

That is, when an operation of the incoming call answer switch 117a is performed, the control unit 102 causes the BT interface unit 103 to transmit an incoming call answer signal to the first cellular phone 121. When an operation of the incoming call reject switch 117b is performed, the control unit 102 causes the BT interface unit 103 to transmit an incoming call reject signal to the first cellular phone 121. When the first cellular phone 121 receives the incoming call answer signal from the in-vehicle handsfree apparatus 101, the first cellular phone 121 transmits an incoming call answer signal to the cellular network 123. When the first cellular phone 121 receives the incoming call reject signal from the in-vehicle handsfree apparatus 101, the first cellular phone 121 transmits an incoming call reject signal to the cellular network 123. Through the above manners, a user can answer to an incoming call by operating the incoming call answer switch 117a and can reject the incoming call by operating the incoming call reject switch 117b.

When the volume up switch 117c is operated while the window for the single phone ringing case is being displayed, the control unit 102 controls the audio amplifier 109 to increase a volume of the ring tone outputted from both of the speakers 110 and 111. When the volume down switch 117d is operated, the control unit 102 controls the audio amplifier 109 to decrease a volume of the ring tone outputted from both of the speakers 110 and 111. Through the above manners, a user can set a sound volume of the ring tone outputted from both of the speakers 110 and 111 to a desired volume by operating the volume up switch 117c and the volume down switch 117d.

It is assumed below that the second cellular phone 122 receives a new incoming call while the first cellular phone is receiving an incoming call. In such a case, the control unit 102 determines that the number of cellular phones receiving an incoming call is two, corresponding to "YES" at S112. Then, process proceeds to S120. At S120, the control unit 102 causes the display device 114 to display a window for a case where two cellular phone are respectively receiving incoming calls at the same time, as exemplified in FIG. 5B. The case where two cellular phones are respectively receiving incoming calls at the same time is also referred to as a two phones ringing case.

When the display is switched from the window for the single phone ringing case to the window for the two phones ringing case, the control unit 102 causes the display device 114 to display information about the first cellular phone 121 (which has earlier received the incoming call) on a right half of the display screen and information about the second cellular phone 122 (which has later received the incoming call)

on a left half of the display window. Thereby, the information about the first cellular phones 121 and the information about the second cellular phones 122 are displayed distinctly from each other. The right half and the left half of the display screen corresponds to a right-hand side and a left-hand side for a user who is sitting down a driver's seat and facing the display screen. In the above case, when the control unit 102 obtains a caller's phone number from the second cellular phone 122, the control unit 102 causes the display device 114 to display the received caller's phone number and a registered name corresponding to the caller's phone number if the phonebook data contains the registered name.

Figure 5B:
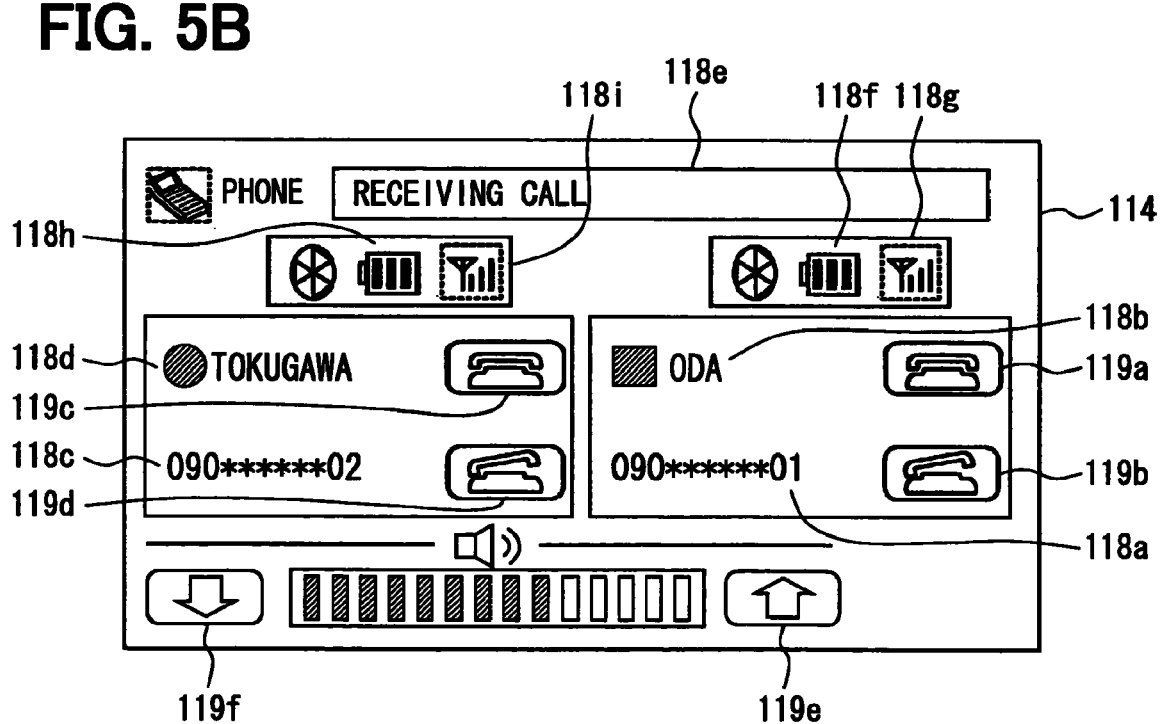
FIG. 5B is a diagram illustrating a window on a screen display for a case where two cellular phones are receiving incoming calls according to the first embodiment.
Figure 6:
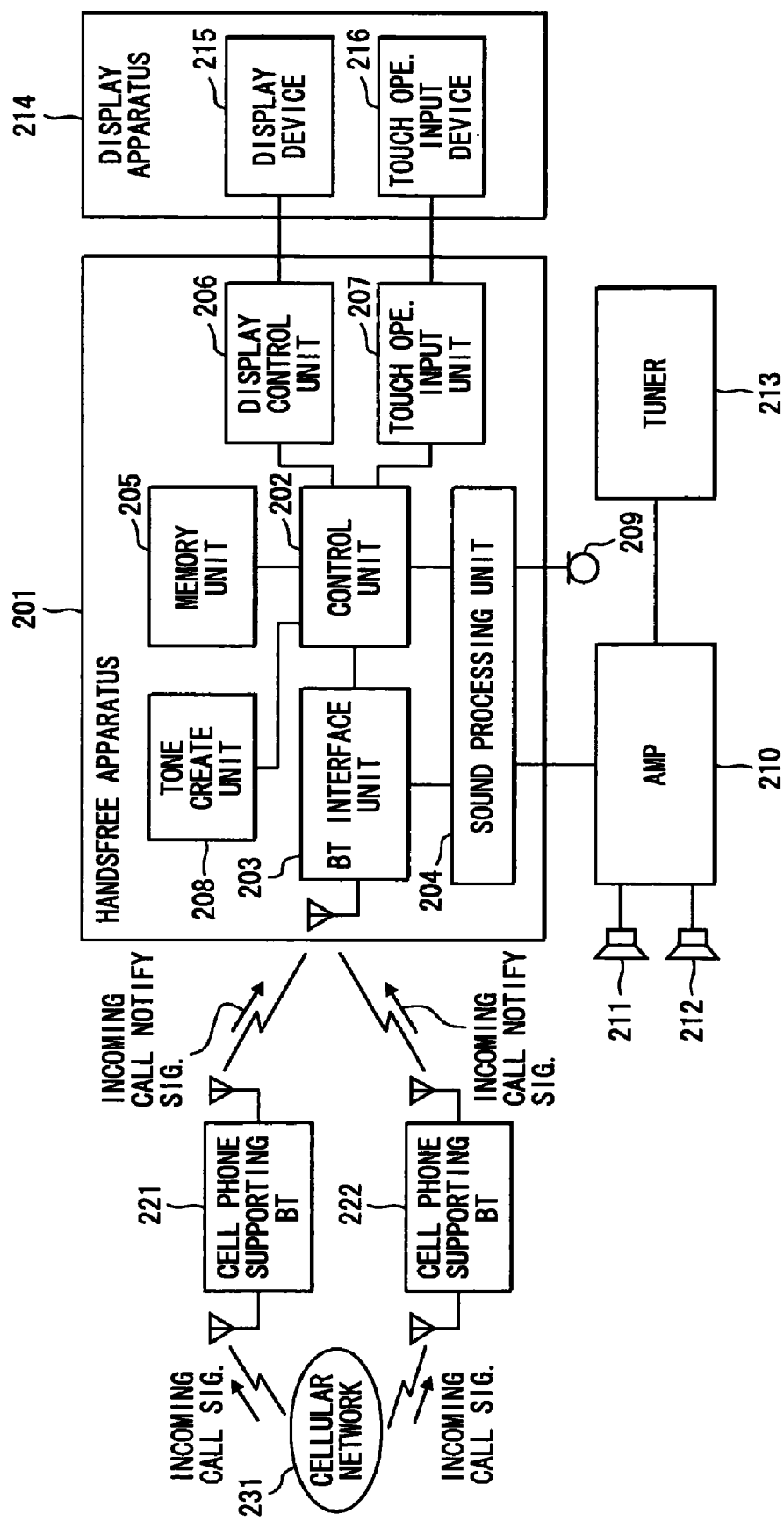
FIG. 6 is a functional block diagram of a handsfree apparatus according to a second embodiment.

FIG. 5B exemplifies a window for a case where: the control unit 102 obtains a caller's phone number "090xxxxxx02" from the second cellular phone 122; the display device 114 display the information about the first cellular phone 121 on a right half of the display window; the information displayed on the right half of the window screen includes a phone number 118a "090xxxxxx01" indicative of a caller of the first cellular phone 121 and a registered name "Mr. Oda" corresponding to the caller of the first cellular phone 121; the display device 114 displays the information about the second cellular phone 122 on a left half of the display window; and the information displayed on the left half of the window screen includes a phone number 118c "090 xxxxxx02" indicative of a caller of the second cellular phone 122 and a registered name "Mr. Tokugawa" corresponding to the caller of the second cellular phone 122 if the phonebook data contains the registered name "Mr. Tokugawa".

Further, in addition to the above information about the incoming calls, the control unit 102 displays an information item 118e indicating a message 118e that incoming calls are being received. Further, for respective cellular phones 121, 122, the control unit 102 displays: a remaining battery level information item 118f indicating a remaining battery level of the first cellular phone 121; a radio reception information item 118g indicating a radio reception sensitivity state of the first cellular phone 121; a remaining battery level information item 118h indicating a remaining battery level of the second cellular phone 122; a radio reception information item 118i indicating a radio reception sensitivity state of the second cellular phone 121. The above information about the radio reception sensitivity and the remaining battery level is transmitted from the first and second cellular phones 121, 122.

At S121, the control unit 102 determines whether the control unit 102 receives a ring tone from one of the first and second cellular phones 121, 122 via the BT interface unit 103 and whether the one of the first and second cellular phones support the in-band ring tone. When the control unit 102 determines that the one of the first and second cellular phones 121, 122 supports the in-band ring tone, corresponding to "YES" at S121, process proceeds to S122. At S122, the control unit 102 causes one of the speakers 110 and 111 to output the ring tone received from the one of the first and second cellular phones 121, 122 via the BT interface unit 103. In other words, the control unit 102 causes the one of the speakers 110 and 111 to output the ring tone that is generally identical to the ring-tone registered on the one of the first and second cellular phones 121, 122.

When the control unit 102 determines that the one of the first and second cellular phones 121, 122 supports the in-band ring tone, corresponding to "NO" at S121, process proceeds to S123. At S123, the control unit 102 searches the ring tone registration data stored in the memory unit 105 and causes the one of the speakers 110 and 111 to output the ring tone that is registered in registration of the one of the first and second cellular phones 121, 122. In other words, the control unit 102 causes the one of the speakers 110 and 111 to output the ring tone that is registered on the in-vehicle handsfree apparatus 101.

At S124, the control unit 102 determines whether the control unit 102 receives a ring tone from the other of the first and second cellular phones 121, 122 via the BT interface unit 103 and whether the other of the first and second cellular phones 121, 122 supports the in-band ring tone. When the control unit 102 determines that the other of the first and second cellular phones 121, 122 supports the in-band ring tone, corresponding to "YES" at S124, process proceeds to S125. At S125, the control unit 102 causes the other of the speakers 110 and 111 to output the ring tone received from the other of the first and second cellular phones 121, 122 via the BT interface unit 103. In other words, the control unit 102 causes the other of the speakers 110 and 111 to output the ring tone that is generally identical to that registered on the other of the first and second cellular phones 121, 122.

When the control unit 102 determines that the other of the first and second cellular phones 121, 122 does not support the in-band ring tone, corresponding to "NO" at S124, process proceeds to S126. At S126, the control unit 102 searches the ring tone registration data stored in the memory unit 105 and causes the other of the speakers 110 and 111 to output the ring tone that is registered in registering the other of the first and second cellular phones 121, 122. In other words, the control unit 102 causes the other of the speakers 110 and 111 to output the ring tone that is registered on the in-vehicle handsfree apparatus 101.

That is, the control unit 102 determines whether the first cellular phone 121, which receives an incoming call earlier and corresponds to the one of the cellular phones 121, supports the in-band ring tone. Then, the control unit 102 causes the display device 114 to display information about the first cellular phone 121 on a right half of the display screen. Following this displaying, the control unit 102 causes the speaker 110, which is located on a right-hand side, to output the ring tone that is transmitted from the first cellular phone 121 or that is registered on the in-vehicle handsfree apparatus 101.

The control unit 102 determines whether the second cellular phone 121, which receives an incoming call later and corresponds to the other cellular phone, supports the in-band ring tone. Then, the control unit 102 causes the display device 114 to display information about the second cellular phone 122 on a left half of the display screen. Following this displaying, the control unit 102 causes the speaker 111, which is located on a left-hand side, to output the ring tone that is transmitted from the second cellular phone 122 or that is recorded in the in-vehicle handsfree apparatus 101.

Through the above manners, a user can visually and distinctly recognize the incoming calls received by the first and second cellular phones 121, 122, by taking a look at the display device 114 displaying the information items indicative of (i) the reception of the incoming calls, (ii) the caller's phone numbers of the first and second cellular phones, and (iii) the corresponding registered names. Further, a user can aurally and distinctly recognize the incoming calls received by the first and second cellular phones 121, 122, by listening to the ring tone outputted from both of the speakers 110 and 111.

Further, on the window for two phones ringing case, the control unit 102 causes the display device 114 to form the following switches for independent use in respective incoming calls: incoming call answer switches 119a and 119c for responding to the respective incoming calls; and incoming call reject switches 119b and 119d for rejecting the respective incoming calls. Further, the control unit 102 causes the display device 114 to form the following switches for common use in the incoming calls: a volume up switch 119e for increasing a sound volume of the ring tones outputted from the speakers 110 and 111; and a volume down switch 119f for decreasing the sound volume of the ring tones outputted from the speakers 110 and 111.

At S118, the control unit 102 determines whether an operation on any one of the incoming calls is performed. When the control unit 102 determines that an operation on any one of the incoming calls is performed, corresponding to "YES" at S118, process proceeds to S119. At S119, the control unit 102 executes a process in accordance with the operation on the incoming calls. Then, the incoming call procedure is ended.

That is, when an operation of the incoming call answer switch 119a is performed while the window for the two phones ringing case is being displayed, the control unit 102 causes the BT interface unit 103 to transmit an incoming call answer signal to the first cellular phone 121. When an operation of the incoming call reject switch 119b is performed, the control unit 102 causes the BT interface unit 103 to transmit an incoming call reject signal to the first cellular phone 121. Through the above manners, a user can response to an incoming call of the first cellular phone 121, which has received the incoming call earlier, by operating the incoming call answer switch 119a. A user also can reject the incoming call of the first cellular phone 121 by operating the incoming call reject switch 119b.

When an operation of the incoming call answer switch 119c is performed while the window for the two phones ringing case is being displayed, the control unit 102 causes the BT interface unit 103 to transmit an incoming call answer signal to the second cellular phone 122. When an operation of the incoming call reject switch 119d is performed, the control unit 102 causes the BT interface unit 103 to transmit an incoming call reject signal to the second cellular phone 122. Through the above manners, a user can answer an incoming call of the second cellular phone 122 by operating the incoming call answer switch 119c. A user also can reject the incoming call of the second cellular phone 122 by operating the incoming call reject switch 119d.

When an operation of the volume up switch 119e is performed while the window for the two phones ringing case is being displayed, the control unit 102 controls the audio amplifier 109 to increase a sound volume of the ring tones outputted from the speaker 110 and the speaker 111. When an operation of the volume down switch 119f is performed, the control unit 102 controls the audio amplifier 109 to decrease a sound volume of the ring tones outputted from the speaker 110 and the speaker 111. Through the above manners, a user can set a sound volume of the ring tones outputted from both of the speakers 110 and 111 to a desired volume by operating the volume up switch 119e or the volume down switch 119f.

When the control unit 102 determines that all of the incoming calls are ended, corresponding to "YES" at S113, the incoming call procedure is ended. While the control unit 102 determines that all of the incoming calls is not ended, corresponding to "NO" at S113, the control unit 102 repeatedly performs the above-described steps S111 to S126. That is, depending on whether the number of cellular phones receiving incoming calls is one or two, the control unit 102 switches a display of the display device 114 between the window for the single phone ringing case and that for the two phones ringing case.

In the above example: two cellular phones are connected with the in-vehicle handsfree apparatus 101 at the same time by using the handsfree profile; when the two cellular phones are respectively receiving incoming calls at the same time, the display window of the display device 114 is partitioned into two regions; an incoming call information item associated with one incoming call is displayed on one region; and an incoming call information item associate with the other incoming call is displayed on the other region. When more than two cellular phones are connected with the in-vehicle handsfree apparatus 101 at the same time by using the handsfree profile, and when the more than two cellular phones are respectively receiving incoming calls at the same time, it is possible to employ manners similar to those for the two cellular phone case.

For example, when four cellular phones are carried into a vehicle and when the four cellular phones are receiving incoming calls at the same time, the display screen of the display device 114 may be partitioned into four regions, which are for example an upper left region, an upper right region, a lower left region and a lower right region. The incoming call information item associate with one of the incoming calls is displayed on a corresponding one of the regions. When four speakers are positioned on a right frontal side, a left frontal side, a right rear side and a left rear side of a vehicle for instance, the control unit 102 may cause the speaker on the right frontal side to output a ring tone corresponding to a cellular phone whose information is displayed on an upper right region of the display screen of the display device 114. Further, the control unit 102 may causes the speaker on the left frontal side to output a ring tone corresponding to a cellular phone whose information is displayed on an upper left region of the display screen of the display device 114. Further, the control unit 102 may causes the speaker on the right rear side to output a ring tone corresponding to a cellular phone whose information is displayed on a lower right region of the display screen of the display device 114. Further, the control unit 102 may causes the speaker on the left rear side to output a ring tone corresponding to a cellular phone whose information is displayed on a lower left region of the display screen of the display device 114.

In the above example, when the display of the display device 114 is switched from the window for the two phone ringing case to that for the two phones ringing case, the control unit 102 causes the display device 114 to display the information about the first cellular phone 121, which has received an incoming call earlier, on a right half of the display screen, and the control unit 102 causes the display device 114 to display the information about the second cellular phone 122, which has received an incoming call later, on a left half of the display screen. Alternatively, the control unit 102 may causes the display device 114 to display the information about the first cellular phone 121 on the left half of the display screen, and the control unit 102 causes the display device 114 to display the information about the second cellular phone 122 on the right half of the display screen.

Taking into account an idea that it is highly likely that a user performs an operation associated with a cellular phone that has received an incoming call earlier, the in-vehicle handsfree apparatus 101 may be configured as follows. When the in-vehicle handsfree apparatus 101 is mounted to a right-hand drive vehicle (which has a steering wheel on a right side of the vehicle), the control unit 102 causes the display device 114 to display the information about the first cellular phone 121 on a right half of the display screen since the right half is closer to a driver's seat and is located closer at hand. When the in-vehicle handsfree apparatus 101 is mounted to a left-hand drive vehicle (which has a steering wheel on a left side of the vehicle), the control unit 102 causes the display device 114 to display the information about the first cellular phone 121 on a left hand side half of the display screen since the left half is closer to a driver's seat.

As described above, according to the in-vehicle handsfree apparatus 101 of the present embodiment, when two cellular phones connected with the in-vehicle handsfree apparatus 101 by using the handsfree profile are receiving incoming calls at the same time, the incoming call information item associated with the first cellular phone 121 and the operation information items on the first cellular phone 121 are displayed distinctly from the incoming call information item associated with the second cellular phone 122 and the operation information items on the second cellular phone 122. Therefore, the in-vehicle handsfree apparatus 101 is capable of properly informing a user of the incoming call of each of the two cellular phones 121 and 122. Further, the in-vehicle handsfree apparatus 101 enables an operation for answering and rejecting each incoming call. Thereby, it is possible to provide high usability.

Further, it is possible to display an incoming call information item associated with and an operation information item on one cellular phone 121 on a right half of the display screen of the display device 114, and possible to output a ring tone corresponding to the one of the cellular phones 121 from a speaker 110 on a right hand side. Further, it is possible to display an incoming call information item associated with and an operation information item on the other of the cellular phones 122 on a left half of the display screen of the display device 114, and possible to output a ring tone corresponding to the other of the cellular phones 122 from a speaker 111 on a left side. Therefore, regarding each cellular phone, it becomes possible to relate the display of the incoming call information item and the operation information item to the output of the ring tone, and it becomes possible to provide a user with a link between a visual sense perception and an aural sense perception. It becomes possible to properly notify a user of an incoming call of each of two cellular phones 121 and 122.

Further, it is possible to display a remaining battery level information item indicating a remaining battery level of each cellular phone 121, 122 and a radio reception information item 116*e* indicating a radio reception sensitivity state of each cellular phone 121, 122. Therefore, it is possible to provide useful information that can be used as an indicator for a user determination on an incoming call, such as answering an incoming call that is received by a cellular phone whose remaining battery level is higher, whose radio reception state is better, and the like.

The present embodiment can be modified and extended in various ways. Examples are described below. Functions of the in-vehicle handsfree apparatus 101 may be incorporated into another in-vehicle apparatus, which is for example an in-vehicle navigation system. The ring tone may be music, ringer melody or the like. An operation means, which corresponds to an incoming call answer switch for answering an incoming call or an incoming call reject switch for rejecting an incoming call, may not be in the form of touch-sensitive switch formed in a display apparatus 113. For example, the operation means may correspond to a mechanical switch, which is for example arranged close to a steering wheel or arranged between a driver's seat and a front passenger seat. In such a case, the in-vehicle handsfree apparatus 101 may further cause the display device 114 to display information about an operating procedure for answering an incoming call and rejecting an incoming call using the operation means.

Layout of the window for the two phone ringing case and that for the two phones ringing case on the display screen may differ from the above-described examples. For example, when the in-vehicle handsfree apparatus 101 does not receive a caller's phone number from a cellular phone 121 or 122, an information item indicative of a message "Caller ID Block" may be displayed. When the in-vehicle handsfree apparatus 101 receives a caller's phone number from a cellular phone 121 or 122, the in-vehicle handsfree apparatus 101 searches the phonebook data for a registered name corresponding to the caller's phone number, and causes the display device 114 to display the registered name corresponding to the caller's phone number. In connection with the above case, a user may edit the phonebook data in advance by operating the in-vehicle handsfree apparatus 101. Alternatively, the in-vehicle handsfree apparatus 101 may receive from the cellular phone 121 or 122 the phonebook data that is edited and stored in the cellular phone 121 or 122 in advance by a user operation. In other words, the in-vehicle handsfree apparatus 101 may search the phonebook data originally stored in the cellular phone 121 or 122 for a registered name corresponding to the caller's phone number and may cause the display device 114 to display the registered name.

A display means or unit may correspond to one display device 114 or multiple display devices. When multiple cellular phones each establishing connection by using the handsfree profile are receiving incoming call at the same time, a position for display of the incoming call information item and the operation information item associated with one or some of the incoming calls may be related to a position of a corresponding one or some of the multiple display devices.

Second Embodiment

A second embodiment is described below with reference to the accompanying drawings.

In the following, two cellular phones each having Bluetooth communication function are assumed as an example of multiple cellular phones. Further, the two cellular phones are assumed to be carried into a vehicle.

An in-vehicle handsfree apparatus 201 is mounted to a vehicle. The in-vehicle handsfree apparatus 201 includes a control unit 202, a BT interface unit 203, a communication sound processing unit 204, a memory unit 205, a display control unit 206, a touch operation input unit 207, and a ring tone creation unit 208. The control unit 202 can function as a control means or section. The BT interface unit 203 can function as a handsfree connection means or section, a ring tone reception means or section, and an identification information reception means or section. The memory unit 205 can function as a ringtone memory means or unit.

The control unit 202 includes a CPU, a RAM, a ROM, and an I/O bus. The control unit 202 controls general operations of the in-vehicle handsfree apparatus 201, such as a communication operation, a data management operation, and the like. The BT interface unit 203 supports a Hands Free Profile for handsfree communication and a Phone Book Access Profile (PBAP) for transfer of phonebook data, incoming call history data, outgoing call history data and the like. The HFP and the PBAP are specified by BT communication specification for handsfree communication. By the HFP, the BT interface unit 203 is connectable at the same time with multiple cellular phones supporting BT, and can support a multi-connection profile.

When a first cellular phone 221 and a second cellular phone 222 each having a BT communication function are carried into a vehicle and are present within the BT communication range of the BT interface unit 203, the BT interface unit 203 establishes connection with the first and second cellular phones 221, 222 by using the HFP. Each of the above profiles may be a communication protocol defined for a corresponding function.

The communication sound processing unit 204 is coupled with a microphone 209 and an audio amplifier 210. The microphone 209 is positioned close to, for example, a steering wheel to clearly collect sounds vocalized by a user. The audio amplifier 210 is disposed in an external part of the in-vehicle handsfree apparatus 201. When handsfree communication is performed using one of the first and second cellular phones 221, 222 carried into the vehicle, the microphone 209 receives outgoing speech vocalized by a user. Then, the communication sound processing unit 204 receives a signal representing the outgoing speech, executes sound-processing of the outgoing speech sound, and outputs the processed signal to the BT interface unit 203. Also, the communication sound processing unit 204 receives a signal representing incoming speech from the BT interface unit 203, and outputs the received signal to the audio amplifier 210. When the audio amplifier 210 receives the signal representing the incoming speech from the communication sound processing unit 204, the audio amplifier 210 amplifies the incoming speech, and causes speakers 211 and 212 to output the amplified incoming speech. The speaker 211, 212 can function as a ring tone output means or unit.

The speakers 211 and 212 are located in the vehicle line-symmetrically with each other. For example, the speaker 211 may be located in a driver side door, and the speaker 212 may be located in a front passenger side door. The audio amplifier 210 is also coupled with a tuner 213 (i.e., a tuner deck). When the tuner 213 receives a signal representing, for example, a radio program from a radio station or a signal representing music sounds stored in a storage medium for music, the audio amplifier 210 amplifies the inputted music sound or the radio program sound. The speakers 211 and 212 outputs such amplified sounds.

The memory unit 205 stores various types of data, which are for example phonebook data, outgoing call history data, incoming call history data and the like. The phonebook data is associated with a correspondence between phone numbers and registered names. The outgoing call history data is associated with a time and a dialed phone number of an outgoing call from the in-vehicle handsfree apparatus 201 or the first or second cellular phones connected with the in-vehicle handsfree apparatus 201 by using the HFP. The incoming call history data is associated with a time and a caller's phone number of an incoming call received by the first or second cellular phone.

A display apparatus 214 includes a display device 215 and a touch operation input device 216, which can function as an operation means or unit. The display device 215 includes a display screen. The touch operation input device 216 provides a touch-sensitive switch on the display screen. When the display control unit 206 receives a display instruction signal from the control unit 202, the display control unit 206 controls display of the display device 215 based on the inputted display instruction signal. The touch operation input device 216 outputs an operation detection signal in response to a user operation of the touch-sensitive switch on the display screen. When the touch operation input unit 207 receives the operation detection signal, the touch operation input unit 207 outputs the operation detection signal to the control unit 202. When the control unit 202 receives the operation detection signal, the control unit 202 analyses the operation detection signal to perform an operation.

The ring tone creation unit 208 creates a monophony in a predetermined band as a ring tone. In advance, a user can select a ring tone from among multiple ring tones by operating the touch-sensitive switch, and a user can register the ring tone that the ring tone creation unit 208 creates for a corresponding cellular phone.

The cellular phones 221, 222 can be classified according to support of an in-band ring tone. A cellular phone supporting an in-band ring tone can transfer a ring tone registered thereon. When the cellular phone 221, 222 supports the in-band ring tone and when the cellular phone 221, 222 receives an incoming call signal from a cellular network 231 while being connected with the in-vehicle handsfree apparatus by using the HFP, the cellular phone 221, 222 transmits a ring tone registered thereon to the in-vehicle handsfree apparatus 201 in addition to an incoming call notification signal and identification information for identification the subject cellular phone 221, 222. The identification information may be a phone number registered on the cellular phone 221, 222. When the cellular phone 221, 222 does not support the in-band ring tone and when the cellular phone 221, 222 receives an incoming call signal from a cellular network 231 while being connected with the in-vehicle handsfree apparatus by using the HFP, the cellular phone 221, 222 transmits the incoming call notification signal and the identification information to the in-vehicle handsfree apparatus 201 but does not transmit a ring tone registered thereon.

When the control unit 202 receives the ring tone in addition to the incoming call notification signal and the identification information from the cellular phone 221, 222, the control unit 202 causes the memory unit 205 to temporarily store the received ring tone, which is generally the same as that registered on the cellular phone 221, 222. Then, the control unit 202 causes the speakers 211, 212 to output the ring tone temporarily stored in the memory unit, and thereby to notify the reception of the incoming call in the cellular phone 221, 222. When the control unit 202 does not receive the ring tone and receives the incoming call notification signal and the identification information from the cellular phone 221, 222, the ring tone creation unit 208 creates a ring tone and the control unit 202 causes the speakers 211, 212 to output the created ring tone, and thereby to notify the reception of the incoming call in the cellular phone 221, 222.

Figure 7:
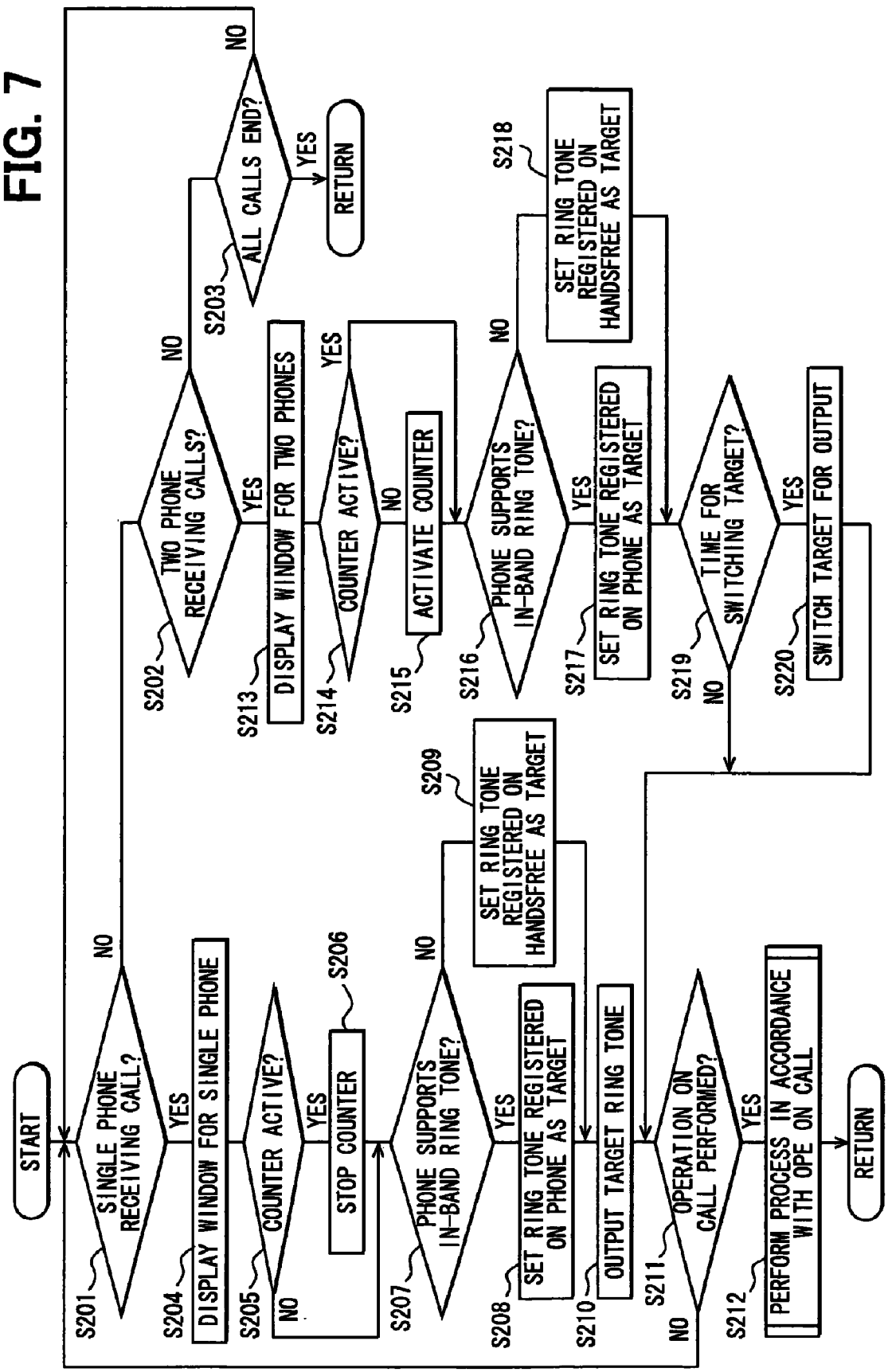
FIG. 7 is a flow chart of an incoming call procedure according to the second embodiment.

Operation of the in-vehicle handsfree apparatus 201 according to a second embodiment is described below with reference to FIGS. 7 to 9B. FIG. 7 is a flow chart exemplifying a procedure performed by the control unit 202. The control unit 202 of the in-vehicle handsfree apparatus 201 starts to execute an incoming call procedure in response to a signal or a trigger for start of the incoming call procedure. The trigger is for example such that the control unit 202 receives an incoming call notification signal from one of first and second cellular phones 221, 222 via the BT interface unit 203. When the control unit 202 starts the incoming call procedure, the control unit 202 determines at S201 and S202 whether the number of cellular phones presently receiving incoming calls is one or two. At S203, the control unit 202 determines whether all of the incoming calls are ended.

It is assumed here that the first cellular phone receives an incoming call first (i.e., earlier) among the first and second cellular phones 221 and 222. When the control unit 202 determines, based on the reception of an incoming call in the first cellular phone 221, that the number of cellular phones receiving incoming calls is one, corresponding to "YES" at S201, process proceeds to S204. At S204, the control unit 202 causes the display device 215 to display on the display screen a window (not shown) for a case where one cellular phone is receiving an incoming call. The above case is referred to also as a single phone ringing case. On the window for the single phone ringing case, the control unit 202 displays, for example: a message "receiving an incoming call"; a phone number of a caller of the first cellular phone 221, which receives the incoming call earlier; and a registered name that is stored in the phonebook data while being coupled with the caller's phone number. Further, on the window for the single phone ringing case, the control unit 202 causes the display device 215 to form various kinds of touch-sensitive switches, including: an incoming call answer switch for responding to the incoming call; an incoming call reject switch for rejecting the incoming call; a volume up switch for increasing a sound volume of the ring tone outputted from the speakers 211 and 212; and a volume down switch for decreasing the sound volume of the ring tone outputted from the speakers 211 and 212.

At S205, the control unit 202 determines whether a counter is active. The counter is used for time management when the control unit 202 causes multiple ring tones to be outputted time-dividedly with each other. When the control unit 202 determines that the counter is active, corresponding to "YES" at S205, process proceeds to S206. At S206, the counter is halted since the counter is not necessary in the single phone ringing case. At S207, it is determined whether a ring tone is received from the first cellular phone through the BT interface unit 203 and whether the first cellular phone supports the in-band ring tone.

When the control unit 202 determines that the ring tone is received from the first cellular phone through the BT interface unit 203 and the first cellular phone supports the in-band ring tone, corresponding to "YES" at S207, process proceeds to S208. At S208, the control unit 202 causes the memory unit 205 to store the ring tone received from the first cellular phone 221, which ring tone is generally identical to that registered on the first cellular phone 221. Further, the control unit 202 sets the stored ring tone as an output target.

When the control unit 202 determines that the ring tone is not received from the first cellular phone 221 through the BT interface unit 203 and that the first cellular phone does not support the in-band ring tone, corresponding to "NO" at S207, process proceeds to S209. At S209, the ring tone creation unit 208 creates a ring tone, and the memory unit 205 stores the created ring tone, which is registered on the in-vehicle handsfree apparatus 201 while being coupled with the first cellular phone 221. Further, the created ring tone stored in the memory unit 205 is set as an output target. At S210, the control unit 202 causes the speakers 211 and 212 to output the ring tone that is set as the output target. According to the above manners, a user can recognize the incoming call of the first cellular phone 221 by listening to the ring tone outputted from the first and second speakers 211 and 212.

At S211, the control unit 202 determines whether an operation on the incoming call is performed in a state where the window for the single phone ringing case is displayed. When it is determined that an operation on the incoming call is performed, corresponding to "YES" at S211, process proceeds to S212. The control unit 202 performs at S212 a process in accordance with the operation on the incoming call, and then, the incoming call procedure is ended. That is, when an operation of the incoming call answer switch is performed, the control unit 202 causes the BT interface unit 203 to transmit an incoming call answer signal to the first cellular phone 221. When an operation of the incoming call reject switch is performed, the control unit 202 causes the BT interface unit 203 to transmit an incoming call reject signal to the first cellular phone 221. When the first cellular phone 221 receives the incoming call answer signal from the in-vehicle handsfree apparatus 201, the first cellular phone 221 transmits an incoming call answer signal to the cellular network 231. When the first cellular phone 221 receives the incoming call reject signal from the in-vehicle handsfree apparatus 201, the first cellular phone 221 transmits an incoming call reject signal to the cellular network 231. Through the above manners, a user can answer an incoming call by operating the incoming call answer switch and can reject the incoming call by operating the incoming call reject switch.

When the volume up switch is operated while the window for the two phone ringing case is being displayed, the control unit 202 controls the audio amplifier 210 to increase a volume of the ring tone outputted from the speakers 211 and 212. When the volume down switch is operated, the control unit 202 controls the audio amplifier 210 to decrease a volume of the ring tone outputted from both of the speakers 211 and 212. Through the above manners, a user can set a sound volume of the ring tone outputted from both of the speakers 211 and 212 to a desired volume by operating the volume up switch or the volume down switch.

It is assumed below that the second cellular phone 222 receives a new incoming call while the first cellular phone is receiving the incoming call. In such a case, the control unit 202 determines that the number of cellular phones receiving incoming calls is two, corresponding to "YES" at S202. Then, process proceeds to S203. At S213, the control unit 202 causes the display device 215 to display a window for a case where two cellular phones are respectively receiving incoming calls at the same time. The case where two cellular phones are respectively receiving incoming calls at the same time is also referred to as a two phones ringing case. On the window for the two phones ringing case, the control unit 202 displays, for example, the followings: an information item indicative of a message "receiving incoming calls" meaning that the incoming calls are being received; a phone number of a caller of the first cellular phone 221, which earlier receives the incoming call; the registered name that is recorded in the phonebook data while being coupled with the caller's phone number of the first cellular phone 221; a phone number of a caller of the second cellular phone 222, which later receives the incoming call; the registered name that is recorded in the phonebook data while being coupled with the caller's phone number of the second cellular phone 222.

At S214, the control unit 202 determines whether the counter is active. When the control unit 202 determines whether the counter is not active, corresponding to "NO" at S214, process proceeds to S215. At S215, the control unit 202 activates the counter since the counter is necessary when the two cellular phones 221, 222 are receiving the incoming calls. At S216, it is determined whether a ring tone is received from the second cellular phone 222 through the BT interface unit 203 and whether the second cellular phone 222 supports the in-band ring tone.

When the control unit 202 determines that the ring tone is received from the second cellular phone 222 through the BT interface unit 203 and the second cellular phone 222 supports the in-band ring tone, corresponding to "YES" at S216, process proceeds to S217. At S217, the control unit 202 causes the memory unit 205 to store the ring tone received from the second cellular phone 221, which ring tone is generally identical to that registered on the second cellular phone. Further, the control unit 202 sets the stored ring tone as an output target.

When the control unit 202 determines that the ring tone is not received from the second cellular phone 222 through the BT interface unit 203 and the second cellular phone 222 does not support the in-band ring tone, corresponding to "NO" at S216, process proceeds to S218. At S218, the ring tone creation unit 208 creates a ring tone, and the memory unit 205 stores the created ring tone, which is registered on the in-vehicle handsfree apparatus 201 while being coupled with the second cellular phone 221). Further, the created ring tone stored in the memory unit 205 is set as an output target.

At S219, the control unit 202 determines whether a counter value of the counter reaches a prescribed value (i.e., a predetermined value prescribed in advance) and whether a present time is right for switching the output target. When the control unit 202 determines that the counter value of the counter reaches the prescribed value and the present time is right for switching the output target, corresponding to "YES" at S219, process proceeds to S220. At S220, the control unit 202 switches the output target and causes the ring tone to be outputted.

Figure 8A:
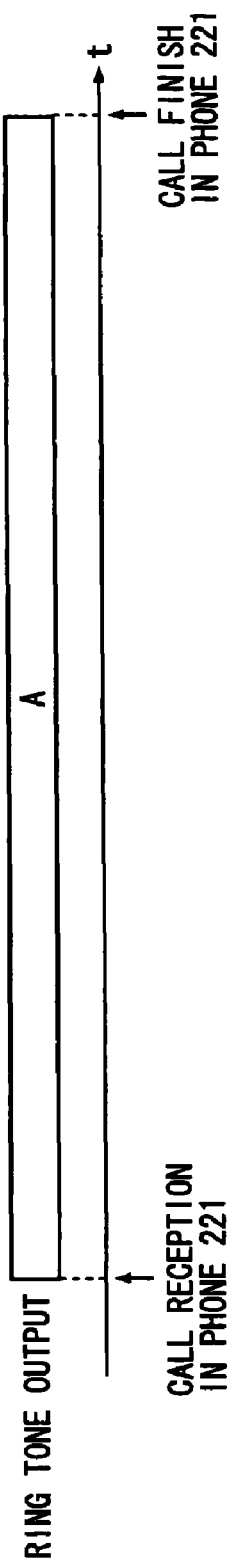
FIGS. 8A to 8C are timing charts each illustrating output of a ring tone according to the second embodiment.
Figure 8B:
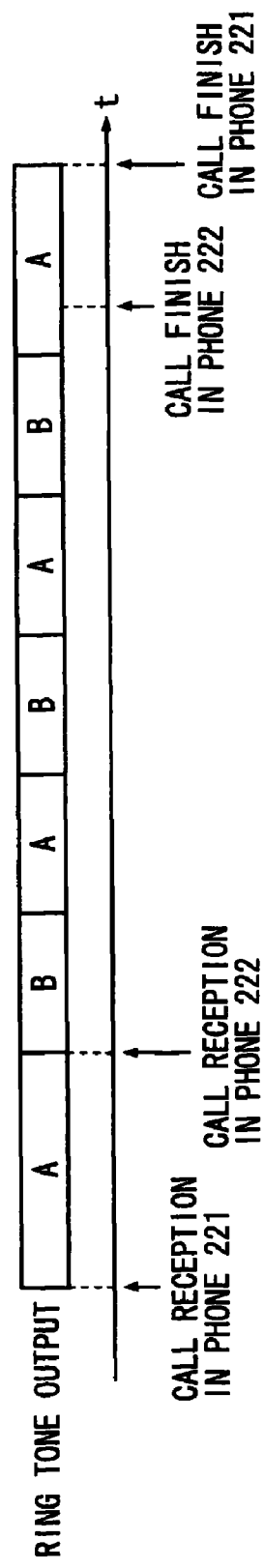
Figure 8C:
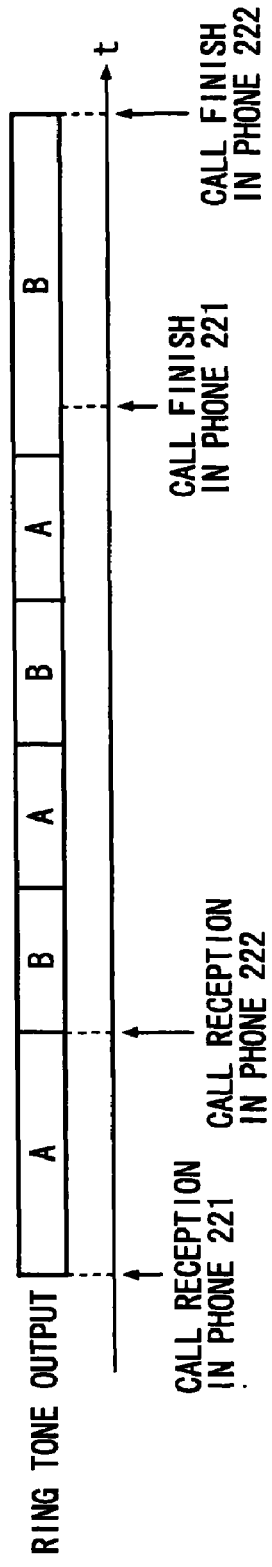

More specifically, the control unit 202 sets a ring tone "A" as the output target so that the ring tone "A" is outputted when the first cellular phone is receiving an incoming call. Further, the control unit 202 sets a ring tone "B" as the output target so that the ring tone "B" is outputted when the second cellular phone is receiving an incoming call. When the first cellular phone 221 receives an incoming call first, and when the second cellular phone 222 later receives an incoming call during the first cellular phone 221 is receiving the incoming call, the ring tone "A" for the first cellular phone 221 and the ring tone "B" for the second cellular phone 222 are alternately outputted at regular time intervals during a period of the two cellular phone 221, 222 receiving the incoming calls, as shown in FIGS. 8B to 8C. In the above case, the prescribed value is set to a same period (e.g., 1 second) for the output of different ring tones. Through the above manners, a user can distinctly recognize the incoming call of the first cellular phone 221 and that of the second cellular phone 222 by listening to the ring tones "A" and "B" that are alternately outputted from the speakers 211 and 212.

At S211, the control unit 202 determines whether an operation on the incoming call is performed in a state where the window for the two phone ringing case is displayed also. When it is determined that the operation on the incoming call is performed, corresponding to "YES" at S211, process proceeds to S212. The control unit 202 performs at S212 a process in accordance with the operation on the incoming call, and then, the incoming call procedure is ended. When the volume up switch is operated while the window for the two phone ringing case is being displayed, the control unit 202 controls the audio amplifier 210 to increase a volume of the ring tones outputted from both of the speakers 211 and 212. When the volume down switch is operated, the control unit 202 controls the audio amplifier 210 to decrease a volume of the ring tones outputted from both of the speakers 211 and 212.

When the control unit 202 determines that all of the incoming calls are ended, corresponding to "YES" at S203, the incoming call procedure is ended. While the control unit 202 determines that all of the incoming calls is not ended, corresponding to "NO" at S203, the control unit 202 repeatedly performs the above-described steps S201 to S220. That is, depending on whether the number of cellular phones receiving incoming calls is one or two, the control unit 202 changes a way of outputting a ring tone.

In the above, description is given on a example case where: two cellular phones are connected with the in-vehicle handsfree apparatus 201 at the same time by using the handsfree profile; and the two cellular phones are respectively receiving incoming calls at the same time. When more than two cellular phones are connected with the in-vehicle handsfree apparatus 201 at the same time by using the handsfree profile, and when the more than two cellular phones are respectively receiving incoming calls at the same time, it is possible to employ manners similar to those for the two cellular phone case.

According to the in-vehicle handsfree apparatus 201 of the present embodiment, when two cellular phones 221 and 222 establish connection with the in-vehicle handsfree apparatus 201 by the HFP and when the two cellular phones 221 and 222 are receiving incoming calls at the same time, the ring tone for one cellular phone 221 and that for the other of the cellular phones 222 are outputted time-dividedly with each other. Therefore, the ring tone for the first cellular phone 221 and that for the second cellular phone 222 are outputted not overlappingly, and thus are alternately and separately outputted. Thereby, it is possible to properly inform a user of the incoming calls of the first and second cellular phones and it is possible to provide high usability.

Figure 9A:
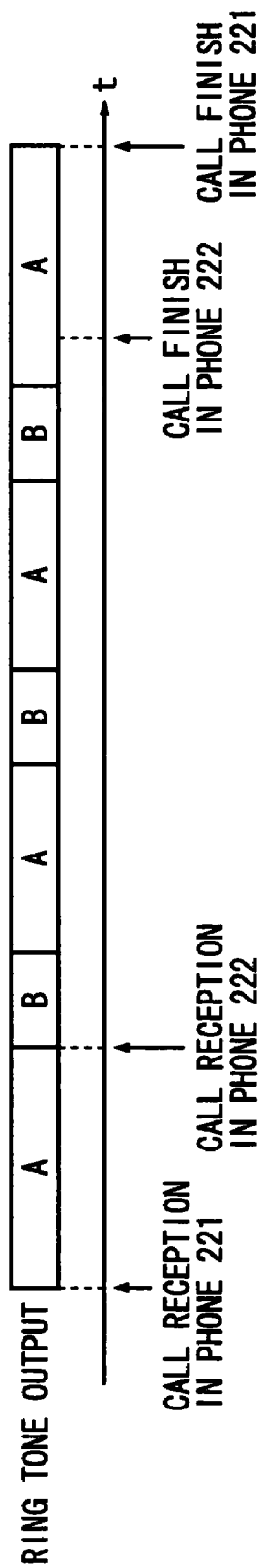
FIGS. 9A and 9B are timing charts each illustrating output of a ring tone according to a modification of the second embodiment.

The present embodiment can be modified and extended in various ways. Examples are described below. Functions of the in-vehicle handsfree apparatus 201 may be incorporated into another in-vehicle apparatus, which is for example an in-vehicle navigation system. Instead of alternately outputting the ring tone for the first cellular phone and that for second cellular phone at regular time intervals, the ring tone for the first cellular phone and that for second cellular phone may be outputted at such time intervals that, as shown in FIG. 9A, a period of outputting the ring tone for the first cellular phone 221 differs from the that for second cellular phone 222. In the above case, the prescribed value is set to different periods (e.g., 1 second and 2 seconds one after the other) for the output of different ring tones. According to the above manner, it is possible to inform a user of a time-sequence of the reception of the incoming calls by the difference in period.

Figure 9B:
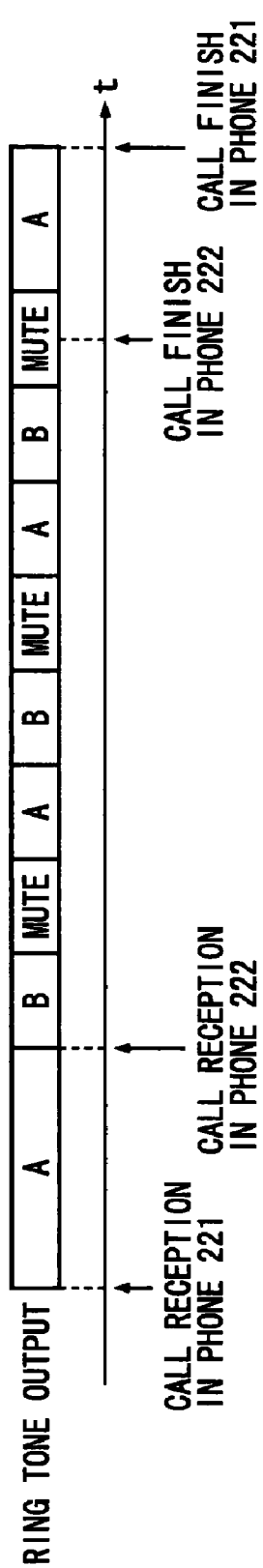

Alternatively, as shown in FIG. 9B, in addition to the period for outputting the ring tone for the first cellular phone 221 and that for the second cellular phone 222, a period of stopping the output of a ring tone may be further set. According to the above manner, it becomes possible to output a sound other than the ring tone in the period of stopping the output of a ring tone; for example, it is becomes possible to output a warning tone. When the ring tone that is set as the output target is a ringer melody, the output of the ring melody may be started from the beginning part of the melody in each time for outputting the ringer melody. Alternatively, the output of the ring melody may be started from a predetermined part (e.g., a feature part) of the melody in each time for starting to output the ringer melody. The predetermined part may be set in advance by a user operation of the touch operation input device 216. According to the above manners, it is possible to output the same part, which is for example the beginning part or the predetermined part of the melody, in each time for starting to output the ringer melody. It becomes therefore possible to properly inform a user of the incoming calls of the cellular phones.

An operation means or unit, which corresponds to an incoming call answer switch for answering an incoming call or an incoming call reject switch for rejecting an incoming call, may not be in the form of touch-sensitive switch formed in a display device 215. For example, the operation means or unit may correspond to a mechanical switch, which is for example arranged close to a steering wheel or arranged between a driver's seat and a front passenger seat. In such a case, the in-vehicle handsfree apparatus 201 may further cause the display device 215 to display information about an operating procedure for answering an incoming call and rejecting an incoming call using the operation means or unit.

The above embodiments have the following aspects.

According to a first aspect, an in-vehicle handsfree apparatus including a handsfree connection section 103 and a control section 102 is provided. The handsfree connection section 103 is configured to establish connection with multiple cellular phones 121, 122 by using a handsfree communication protocol. The control section 102 configured to determine whether, of the multiple cellular phones 121, 122, a first cellular phone 121, 122 connected with the handsfree connection section 103 and a second cellular phone connected with the handsfree connection section 103 are respectively receiving a first incoming call and a second incoming call at a same time. When the control section 102 determines that the first and second cellular phones 121, 122 are respectively receiving the first and second incoming calls at the same time, the control section 103 causes an external display unit 114 to distinctly display: (i) a first incoming call information item associated with the first incoming call and a first operation information item associated with a user operation on the first incoming call; and (ii) a second incoming call information item associated with the second incoming call and a second operation information item associated with a user operation on the second incoming call.

Accordingly, since the first incoming call information item and the first operation information item are displayed distinctly from the second incoming call information item and the second operation information item, it is possible to properly inform a user of reception of incoming calls in multiple cellular phones, and it is possible improve usability.

The above in-vehicle handsfree apparatus may be configured as follows. When the control section 102 determines that the first and second cellular phones 121, 122 are respectively receiving the first and second incoming calls at the same time, the control section 102 further causes a first external sound output unit 110, 111 and a second external sound output unit 110, 111 to respectively output a first ring tone corresponding to the first cellular phone 121, 122 and a second ring tone corresponding to the second cellular phone 121, 122 at a same time.

Accordingly, it is possible to properly inform a user of reception of incoming calls in multiple cellular phones not only visually also aurally manner, and it is possible improve usability.

The above in-vehicle handsfree apparatus may be configured as follows. When the control section 102 determines that the first and second cellular phones 121, 122 are respectively receiving the first and second incoming calls at the same time, the control section 102 causes the external display unit 114 to display: the first incoming call information item and the first operation information item on a first external sound output unit 110, 111 side of a display screen of the external display unit 114; and the second incoming call information item and the second operation information item on a second external sound output unit 110, 111 side of the display screen of the external display unit 114.

Accordingly, a user can relate (i) a region of the display screen for displaying the incoming call information item and the first operation information item associate with one of the cellular phones 121, 122 to (ii) one of the external sound output units 110, 111 which outputs a ring tone corresponding to the one of the cellular phones 121, 122. Thereby, a use can relate visual perception about an incoming call to aural perception about the incoming call. It is possible to properly inform a user of reception of multiple incoming calls of cellular phones.

The above in-vehicle handsfree apparatus may further include a ring tone acquire section 103. The ring tone acquire section 103 is configured to receive from the first cellular phone 121, 122 a third ring tone registered on the first cellular phone 121, 122, and configured to receive from the second cellular phone 121, 122 a fourth ring tone registered on the second cellular phone 121, 122. The control section 102 causes the first ring tone, which corresponds to the first cellular phone 121, 122 and is outputted from the first external sound output unit 110, 111, to be generally identical to the third ring tone. The control section 102 causes the second ring tone, which corresponds to the second cellular phone 121, 122 and is outputted from the second external sound output unit 110, 111, to be generally identical to the forth ring tone.

Accordingly, a ring tone pre-registered on the cellular phone 121, 122 can be transferred from the cellular phone 121, 122, and thereby, the ring tone registered on the cellular phone 121, 122 can be outputted from the external sound output unit 110, 111.

The above in-vehicle handsfree apparatus may further includes an identification information reception section 103 and a memory unit 105. The identification information reception section 103 is configured to receive first identification information for identification of the first cellular phones 121, 122 from the first cellular phones 121, 122, and is configured to receive second identification information for identification of the second cellular phones 121, 122 from the second cellular phones 121, 122. The memory unit 105 is configured to store a correspondence relation between phone information about the first cellular phone 121, 122 and a fifth ring tone and between cellular information about the second cellular phone 121, 122 and a sixth ring tone. The control section 102 is configured to specify the first cellular phones 121, 122 based on the first identification information, and configured to cause the first ring tone, which corresponds to the first cellular phone 121, 122 and is outputted from the first external sound output unit 110, 111, to be the fifth ring tone. The control section 102 is configured to specify the second cellular phones 121, 122 based on the second identification information, and configured to causes the second ring tone, which corresponds to the second cellular phone 121, 122 and is outputted from the second external sound output unit 110, 111, to be the sixth ring tone.

Accordingly, if a ring tone pre-registered on the cellular phone 121, 122 is not transferred from the cellular phone 121, 122, a ring tone registered on the in-vehicle handsfree apparatus can be outputted since the ring tone is pre-registered on the cellular phone 121, 122.

The above in-vehicle handsfree apparatus may be configured as follows. When the control section 102 determines that the first and second cellular phones 121, 122 are respectively receiving the first and second incoming calls at the same time, the control section 102 further causes the external display unit 114 to distinctly display: a first remaining battery level information item indicative of a remaining battery level of the first cellular phone 121, 122; and a second remaining battery level information item indicative of a remaining battery level of the second cellular phone 121, 122.

Accordingly, it is possible provide a user with useful information that can be an indicator for a user judgment towards the incoming calls, such as answering an incoming call of a cellular phone whose remaining battery level is higher than that of another cellular phone based on remaining battery level information indicating the remaining battery level of each of multiple cellular phones.

The above in-vehicle handsfree apparatus may be configured as follows. When the control section 102 determines that the first and second cellular phones 121, 122 are respectively receiving the first and second incoming calls at the same time, the control section 102 causes further causes the external display unit 114 to distinctly display: a first radio reception information item indicative of a radio reception sensitivity level of the first cellular phone 121, 122; and a second radio reception information item indicative of a radio reception sensitivity level of the second cellular phone 121, 122.

Accordingly, it is possible provide a user with useful information that can be an indicator for a user judgment towards the incoming calls, such as answering an incoming call of a cellular phone whose radio reception sensitivity level is better than that of another cellular phone based on radio reception sensitivity level information indicating the radio reception sensitivity level of each of multiple cellular phones.

According to a second aspect of the above embodiments, an in-vehicle handsfree apparatus includes a handsfree connection section 203 and a control section 202. The handsfree connection section 203 is configured to establish connection with multiple cellular phones 221, 222 by using a handsfree communication protocol. The control section 202 is configured to determine whether, of the multiple cellular phones 221, 222, a first cellular phone 121, 122 connected with the handsfree connection section 103 and a second cellular phone connected with the handsfree connection section 103 are respectively receiving a first incoming call and a second incoming call at a same time. When the control section 202 determines that the first and second cellular phones 221, 222 are respectively receiving the first and second incoming calls at the same time, the control section 202 causes an external ring tone output unit 211, 212 to time-divisionally perform an output of a first ring tone corresponding to the first incoming call and an output of a second ring tone corresponding to the second incoming call.

According to the above in-vehicle handsfree apparatus, multiple ring tones are outputted not overlappingly but separately. The multiple ring tones are alternately outputted. Thereby, it is possible to properly inform a user of ring tones associated with multiple cellular phones and it is possible to improve usability.

The above in-vehicle handsfree apparatus may be configured such that the control section 202 causes the external ring tone output unit 211, 212 to time-divisionally perform the output of the first ring tone and the output of the second ring tone at regular time intervals.

According to the above in-vehicle handsfree apparatus, it is possible to distribute a period of the output of the first ring tone corresponding to the first cellular phone 221, 222 and a period of the output of the second ring tone corresponding to the second cellular phone 221, 222 evenly.

The in-vehicle handsfree apparatus may be configured such that the control section 202 causes the external ring tone output unit 211, 212 to time-divisionally perform the output of the first ring tone and the output of the second ring tone at unequal time intervals.

According to the above in-vehicle handsfree apparatus, it is possible to distribute a period of the output of the first ring tone corresponding to the first cellular phone 221, 222 and a period of the output of the second ring tone corresponding to the second cellular phone 221, 222 unevenly. For example, by setting a difference between a period of the output of a ring tone corresponding to a cellular phone that receives an incoming call earlier and that correspond to a cellular phone that receives an incoming call later, it is possible to inform a user of a time sequence of reception of the incoming calls by using the period difference.

The above in-vehicle handsfree apparatus may be configured such that the control section 202 causes the external ring tone output unit 211, 212 to time-divisionally perform the output of the first ring tone, the output of the second ring tone, and a stop of the output of both of the first ring tone and second ring tone.

According to the above in-vehicle handsfree apparatus, it is possible to prevent a case where the output of one of the first and second ring tones continues. Further, by utilizing a period of the stop of the output of both of the first and ring tones, it is possible to output another sound other than ring tones, such as a warring tone.

The above in-vehicle handsfree apparatus may further includes a ring tone reception section 203. The ring tone reception section 203 is configured to receive from the first cellular phone 221, 222 a third ring tone registered on the first cellular phone 221, 222, and configured to receive from the second cellular phone 221, 222 a fourth ring tone registered on the second cellular phone 221, 222. The control section 202 causes the first ring tone, which corresponds to the first cellular phone 221, 222 and is outputted from the external ring tone output unit 211, 212, to be generally identical to the third ring tone. The control section 202 causes the second ring tone, which corresponds to the second cellular phone 221, 222 and is outputted from the external ring tone output unit 211, 212, to be generally identical to the forth ring tone.

According to the above in-vehicle handsfree apparatus, it is possible to output a ring tone registered on a cellular phone by transfer of the ring tone registered on the cellular phone.

The above in-vehicle handsfree apparatus may further includes: a ring tone memory unit 205. The ring tone memory unit 205 is configured to store the third ring tone received from the first cellular phone 221, 222, and configured to store the fifth ring tone received from the second cellular phone 221, 222. When the third ring tone is a first ringer melody and when the ring tone memory unit 205 stores the first ring melody, the control section 202 causes the external ring tone output unit 211, 212 to start to output the first ringer melody from a beginning part of the first ringer melody in each time of the output of the first ringer melody. When the fourth ring tone is a second ringer melody and when the ring tone memory unit 205 stores the second ring melody, the control section 202 causes the external ring tone output unit 211, 212 to start to output the second ringer melody from a beginning part of the second ringer melody in each time of the output of the second ringer melody.

According to the above in-vehicle handsfree apparatus, in each time of the output of a ringer melody, it is possible to start to output the ringer melody from a beginning part, which is the same in each time of the output. Thereby, it is possible to properly inform a user of reception of an incoming call in a cellular phone.

The above in-vehicle handsfree apparatus may further includes a ring tone memory unit 205 and an operation section 215. The ring tone memory unit 205 is configured to store the third ring tone received from the first cellular phone 221, 222, and configured to store the fifth ring tone received from the second cellular phone 221, 222. The operation section 215 is configured to receive, when the third ring tone is a first ringer melody, a user operation for setting a first predetermined part of the first ringer melody as a first feature part, and configured to receive, when the third ring tone is a second ringer melody, a user operation for setting a second predetermined part of the second ringer melody as a second feature part. When the ring tone memory unit 205 stores the first ring melody, the control section 202 causes the external ring tone output unit 211, 212 to output the first ringer melody from the first feature part of the first ringer melody in each time of starting to output the first ringer melody. When the ring tone memory unit 205 stores the second ring melody, the control section 202 causes the external ring tone output unit 211, 212 to output the second ringer melody from the second feature part of the second ringer melody in each time of starting to output the second ringer melody.

According to the above in-vehicle handsfree apparatus, in each time of the output of a ringer melody, it is possible to start to output the ringer melody from a predetermined part, which is set as a feature part by a user and is the same in each time of the output. Thereby, it is possible to properly inform a user of reception of an incoming call in a cellular phone.

While the invention has been described above with reference to various embodiments thereof, it is to be understood that the invention is not limited to the above described embodiments and construction. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

Further, each or any combination of processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be downloaded and installed in a computer via a communications network.

What is claimed is:

1. An in-vehicle handsfree apparatus, comprising:
   a handsfree connection section configured to establish connection with a plurality of cellular phones by using a handsfree communication protocol; and
   a control section configured to:
      determine whether, of the plurality of cellular phones, a first cellular phone connected with the handsfree connection section and a second cellular phone connected with the handsfree connection section are respectively receiving a first incoming call and a second incoming call at a same time; and
      cause an external display unit, when the control section determines that the first and second cellular phones are respectively receiving the first and second incoming calls at the same time, to distinctly display:
         (i) a first incoming call information item associated with the first incoming call and a first operation information item associated with a user operation on the first incoming call; and
         (ii) a second incoming call information item associated with the second incoming call and a second operation information item associated with a user operation on the second incoming call,
      wherein
      when the control section determines that the first and second cellular phones are respectively receiving the first and second incoming calls at the same time, the control section further
         causes a first external sound output unit and a second external sound output unit to respectively output a first ring tone corresponding to the first cellular phone and a second ring tone corresponding to the second cellular phone at the same time while causing the external display unit to simultaneously display
            the first incoming call information item and the first operation information item on a first region of a display screen of the external display unit and
            the second incoming call information item and the second operation information item on a second region of the display screen of the external display unit, such that:
         the first and second regions of the display screen respectively correspond in location to the first and second external sound output units such that the first region is closer to the first external sound output unit than the second region is, and the second region is closer to the second external sound output unit than the first region is;
         the first operation information item displayed on the first region of the display screen is a first switch that is user operable to respond to the first incoming call; and
         the second operation information item displayed on the second region of the display screen is a second switch that is user operable to respond to the second incoming call.

2. The in-vehicle handsfree apparatus according to claim 1, further comprising:
   a ring tone acquire section configured to receive from the first cellular phone a third ring tone registered on the first cellular phone, and configured to receive from the second cellular phone a fourth ring tone registered on the second cellular phone,
   wherein:
   the control section causes the first ring tone, which corresponds to the first cellular phone and is outputted from the first external sound output unit, to be generally identical to the third ring tone; and
   the control section causes the second ring tone, which corresponds to the second cellular phone and is outputted from the second external sound output unit, to be generally identical to the forth ring tone.

3. The in-vehicle handsfree apparatus according to claim 1, further comprising:
   an identification information reception section configured to receive first identification information for identification of the first cellular phones from the first cellular phones, and configured to receive second identification information for identification of the second cellular phones from the second cellular phones; and
   a memory unit configured to store a correspondence relation between a fifth ring tone and first phone information about the first cellular phone, and between a sixth ring tone and second information about the second cellular phone,
   wherein:
   the control section is configured to specify the first cellular phones based on the first identification information, and configured to cause the first ring tone, which corresponds to the first cellular phone and is outputted from the first external sound output unit, to be the fifth ring tone;
   the control section is configured to specify the second cellular phones based on the second identification information, and configured to causes the second ring tone, which corresponds to the second cellular phone and is outputted from the second external sound output unit, to be the sixth ring tone.

4. The in-vehicle handsfree apparatus according to claims 1, wherein:
when the control section determines that the first and second cellular phones are respectively receiving the first and second incoming calls at the same time, the control section further causes the external display unit to distinctly display:
a first remaining battery level information item indicative of a remaining battery level of the first cellular phone; and
a second remaining battery level information item indicative of a remaining battery level of the second cellular phone.

5. The in-vehicle handsfree apparatus according to claims 1, wherein:
when the control section determines that the first and second cellular phones are respectively receiving the first and second incoming calls at the same time, the control section causes further causes the external display unit to distinctly display:
a first radio reception information item indicative of a radio reception sensitivity level of the first cellular phone; and
a second radio reception information item indicative of a radio reception sensitivity level of the second cellular phone.

6. An in-vehicle handsfree apparatus, comprising:
a handsfree connection section configured to establish connection with a plurality of cellular phones by using a handsfree communication protocol; and
a control section configured to:
determine whether, of the plurality of cellular phones, a first cellular phone connected with the handsfree connection section and a second cellular phone connected with the handsfree connection section are respectively receiving a first incoming call and a second incoming call at a same time; and
cause an external ring tone output unit to time-divisionally perform an output of a first ring tone corresponding to the first incoming call and an output of a second ring tone corresponding to the second incoming call when the control section determines that the first and second cellular phones are respectively receiving the first and second incoming calls at the same time, so that the first ring tone and the second ring tone are alternately outputted from the external ring tone output unit at predetermined time intervals;
a ring tone reception section configured to receive from the first cellular phone a third ring tone registered on the first cellular phone; and
a ring tone memory unit configured to store the third ring tone received from the first cellular phone,
wherein:
when the control section determines that the first and second cellular phones are respectively receiving the first and second incoming calls at the same time and when the third ring tone stored in the ring tone memory unit is in a form of a ringer melody, the control section causes the external ring tone output unit to alternately output the ringer melody corresponding to the first cellular phone and the second ring tone corresponding to the second cellular phone at the predetermined time intervals, such that
each time the ringer melody is outputted during an alternate output of the ringer melody and the second ring tone, the output of the ringer melody starts with a beginning part of the ringer melody.

7. The in-vehicle handsfree apparatus according to claim 6, wherein:
the control section causes the external ring tone output unit to time-divisionally perform the output of the first ring tone and the output of the second ring tone at regular time intervals.

8. The in-vehicle handsfree apparatus according to claim 6, wherein:
the control section causes the external ring tone output unit to time-divisionally perform the output of the first ring tone and the output of the second ring tone at unequal time intervals.

9. The in-vehicle handsfree apparatus according to claim 6, wherein:
the control section causes the external ring tone output unit to time-divisionally perform the output of the first ring tone, the output of the second ring tone, and a stop of the output of both of the first ring tone and second ring tone.

10. The in-vehicle handsfree apparatus according to claim 6, wherein:
the ring tone reception section is configured to receive from the second cellular phone a fourth ring tone registered on the second cellular phone,
wherein:
the control section causes the first ring tone, which corresponds to the first cellular phone and is outputted from the external ring tone output unit, to be generally identical to the third ring tone; and
the control section causes the second ring tone, which corresponds to the second cellular phone and is outputted from the external ring tone output unit, to be generally identical to the forth ring tone.

11. The in-vehicle handsfree apparatus according to claim 10, wherein:
the ring tone memory unit is configured to store the fourth ring tone received from the second cellular phone,
wherein:
when the third ring tone is a first ringer melody and when the ring tone memory unit stores the first ring melody, the control section causes the external ring tone output unit to start to output the first ringer melody from a beginning part of the first ringer melody in each time of the output of the first ringer melody; and
when the fourth ring tone is a second ringer melody and when the ring tone memory unit stores the second ring melody, the control section causes the external ring tone output unit to start to output the second ringer melody from a beginning part of the second ringer melody in each time of the output of the second ringer melody.

12. An in-vehicle handsfree apparatus, comprising:
a handsfree connection section configured to establish connection with a plurality of cellular phones by using a handsfree communication protocol; and
a control section configured to:
determine whether, of the plurality of cellular phones, a first cellular phone connected with the handsfree connection section and a second cellular phone connected with the handsfree connection section are respectively receiving a first incoming call and a second incoming call at a same time; and
cause an external ring tone output unit to time-divisionally perform an output of a first ring tone corresponding to the first incoming call and an output of a second ring tone corresponding to the second incoming call when the control section determines that the first and second cellular phones are respectively receiving the first and second incoming calls at the same time, so that the first ring tone and the second ring tone are alternately outputted from the external ring tone output unit at predetermined time intervals;

a ring tone reception section configured to receive from the first cellular phone a third ring tone registered on the first cellular phone; a ring tone memory unit configured to store the third ring tone received from the first cellular phone;

an operation section configured to receive, when the third ring tone is in a form of a ringer melody, a user operation for setting a part of the ringer melody as a feature part of the ringer melody, wherein:

when the control section determines that the first and second cellular phones are respectively receiving the first and second incoming calls at the same time and when the third ring tone stored in the ring tone memory unit is in the form of the ringer melody, the control section causes the external ring tone output unit to alternately output the ringer melody corresponding to the first cellular phone and the second ring tone corresponding to the second cellular phone at the predetermined time intervals, such that each time the ringer melody is outputted during an alternate output of the ringer melody and the second ring tone, the output of the ringer melody starts with the feature part set by the user operation via the operation section.

13. An in-vehicle handsfree apparatus, comprising:

a handsfree connection section configured to establish connection with a plurality of cellular phones by using a handsfree communication protocol; and a control section configured to:

determine whether, of the plurality of cellular phones, a first cellular phone connected with the handsfree connection section and a second cellular phone connected with the handsfree connection section are respectively receiving a first incoming call and a second incoming call at a same time; and cause an external display unit, when the control section determines that the first and second cellular phones are respectively receiving the first and second incoming calls at the same time, to simultaneously distinctly display both:

(i) a first incoming call information item associated with the first incoming call and a reject switch and an answer switch associated with the first incoming call; and (ii) a second incoming call information item associated with the second incoming call and a reset switch and an answer switch associated with the second incoming call.

* * * * *